(12) United States Patent
Na et al.

(10) Patent No.: US 9,116,565 B2
(45) Date of Patent: Aug. 25, 2015

(54) MOBILE TERMINAL AND METHOD OF CONTROLLING THE MOBILE TERMINAL

(71) Applicant: LG ELECTRONICS INC., Seoul (KR)

(72) Inventors: Changju Na, Seoul (KR); Sungchae Na, Seoul (KR); Jeongeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 14/073,630

(22) Filed: Nov. 6, 2013

(65) Prior Publication Data

US 2014/0267098 A1   Sep. 18, 2014

(30) Foreign Application Priority Data

Mar. 15, 2013   (KR) .................. 10-2013-0028207

(51) Int. Cl.
*G06F 3/041* (2006.01)
*H04N 21/2343* (2011.01)
*H04N 21/414* (2011.01)
*H04N 21/44* (2011.01)
*H04N 21/4402* (2011.01)

(52) U.S. Cl.
CPC ........ *G06F 3/041* (2013.01); *H04N 21/234345* (2013.01); *H04N 21/41407* (2013.01); *H04N 21/4402* (2013.01); *H04N 21/44004* (2013.01)

(58) Field of Classification Search
None
See application file for complete search history.

(56) References Cited

U.S. PATENT DOCUMENTS

| | | |
|---|---|---|
| 2009/0150557 A1 | 6/2009 | Wormley et al. |
| 2011/0249073 A1 | 10/2011 | Cranfill et al. |
| 2012/0120181 A1 | 5/2012 | Kanalakis, Jr. et al. |

FOREIGN PATENT DOCUMENTS

| | | |
|---|---|---|
| EP | 1 085 443 A2 | 3/2001 |
| WO | WO 2008/058257 A2 | 5/2008 |
| WO | WO 2009/020640 A2 | 2/2009 |

*Primary Examiner* — Nicholas Lee
(74) *Attorney, Agent, or Firm* — Birch, Stewart, Kolasch & Birch, LLP

(57) ABSTRACT

A mobile terminal including a wireless communication unit configured to communicate with a content provision server over a network; a touch screen display unit configured to display a first image object associated with first content downloading from the content provision server and a second image object associated with second content that can be downloaded next from the content provision server; and a controller configured to receive a first input indicating the second image object is moved to be adjacent to the first image object, and download the second content corresponding to the second image object as soon as the first content corresponding to the first image object is downloaded.

20 Claims, 21 Drawing Sheets

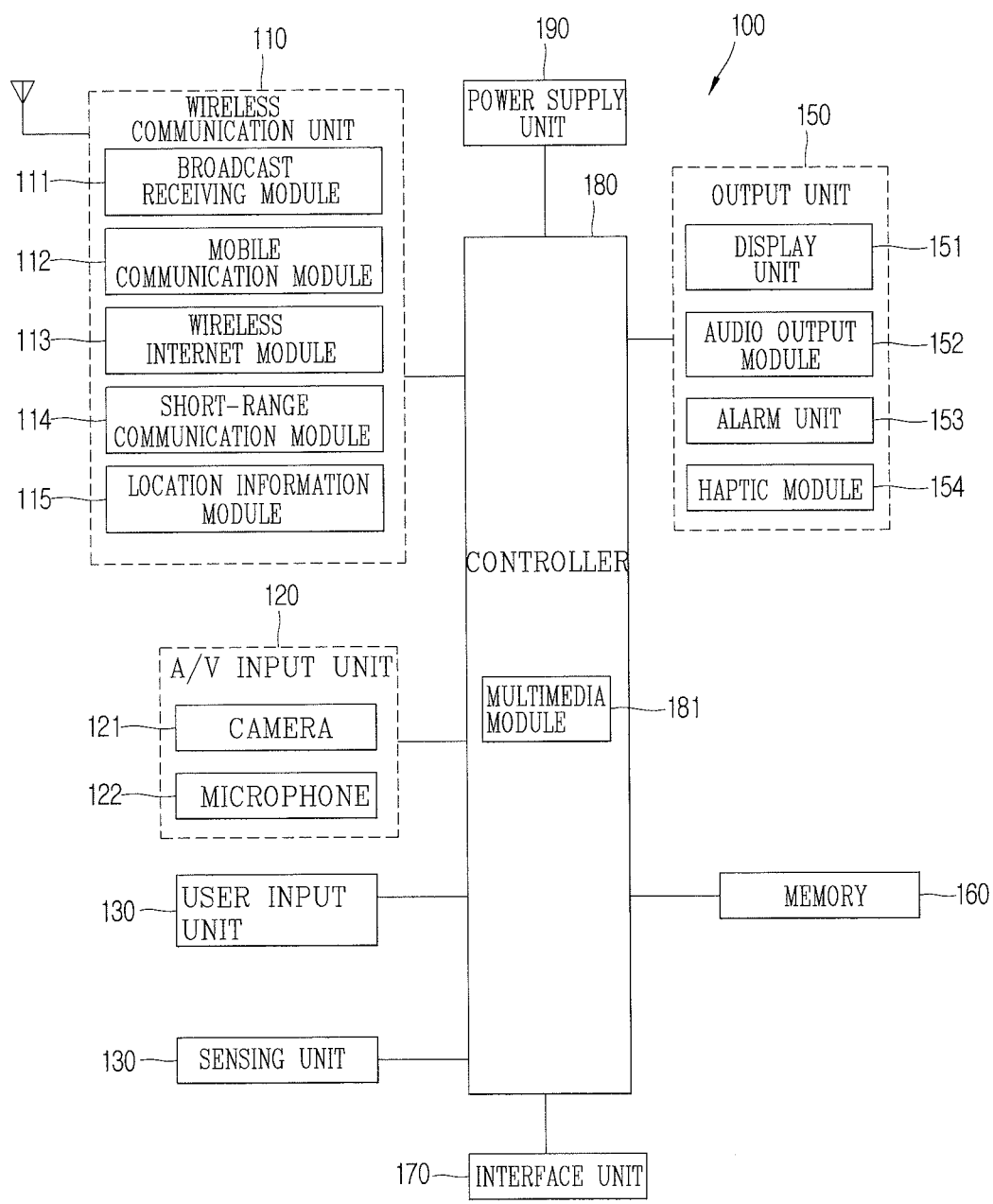

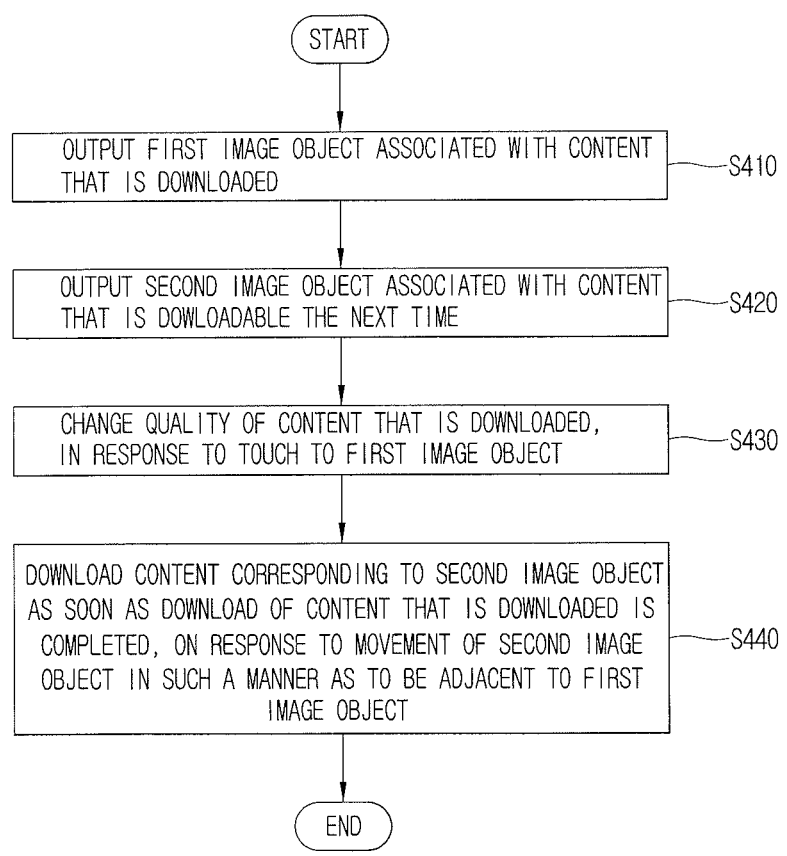

FIG. 7E
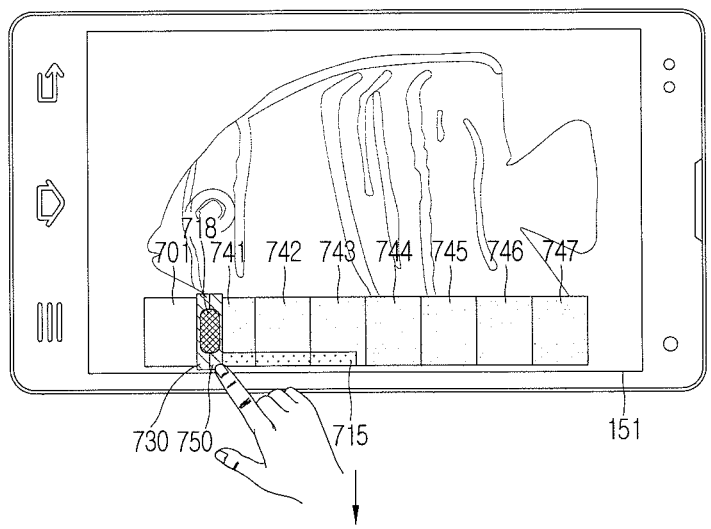
(a)
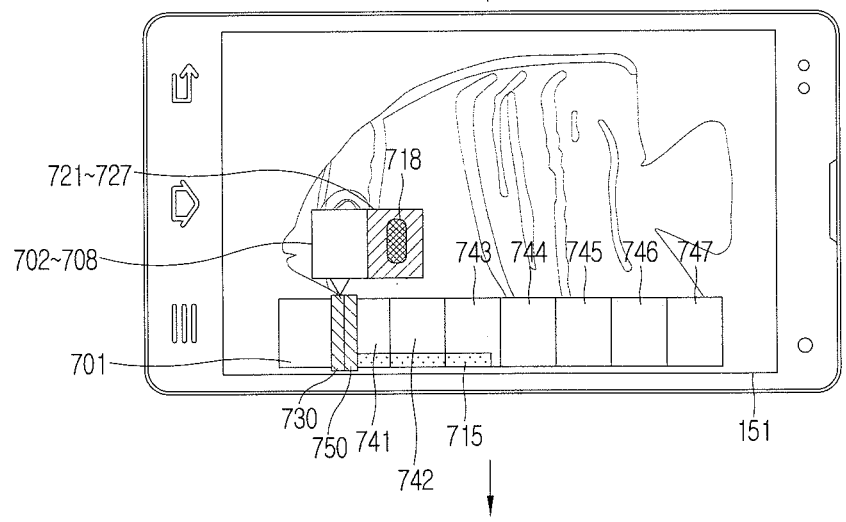
(b)
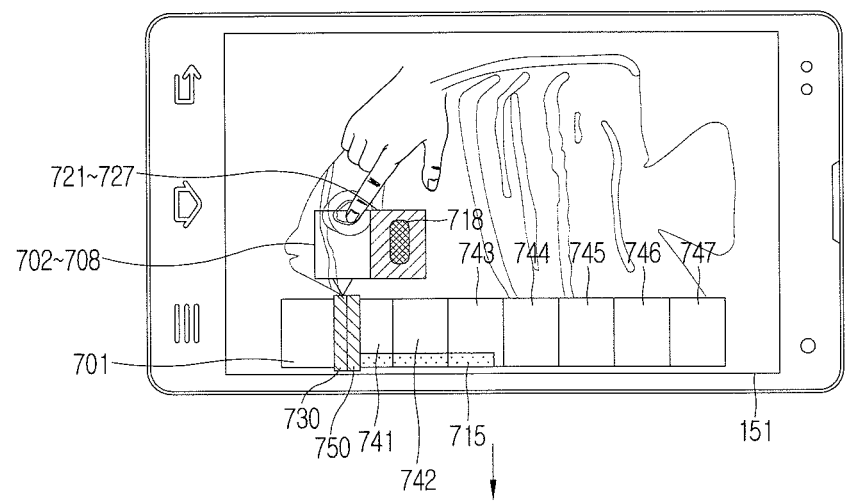
(c)

FIG. 7F
(a)
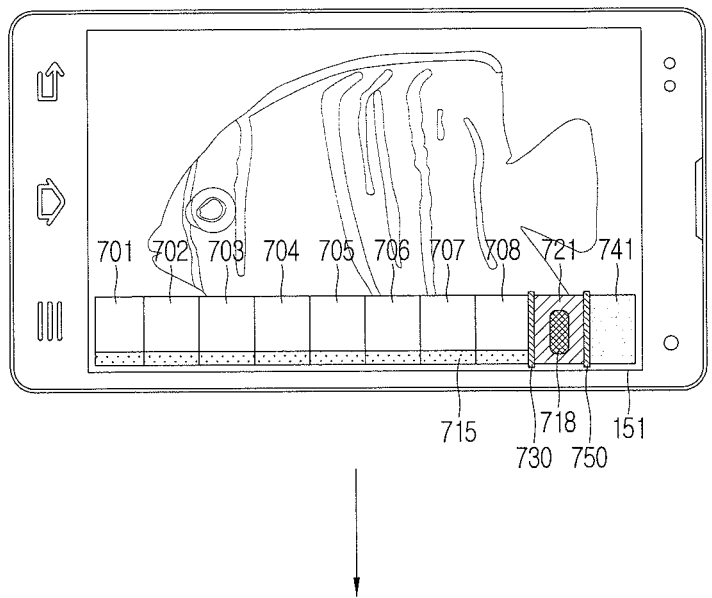
(b)
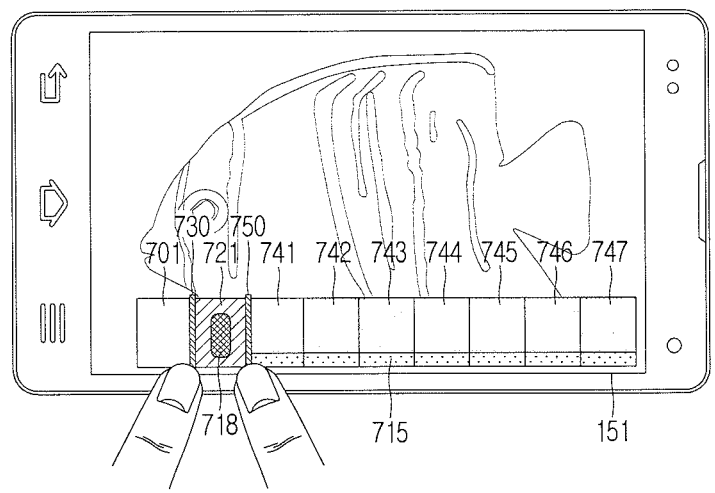

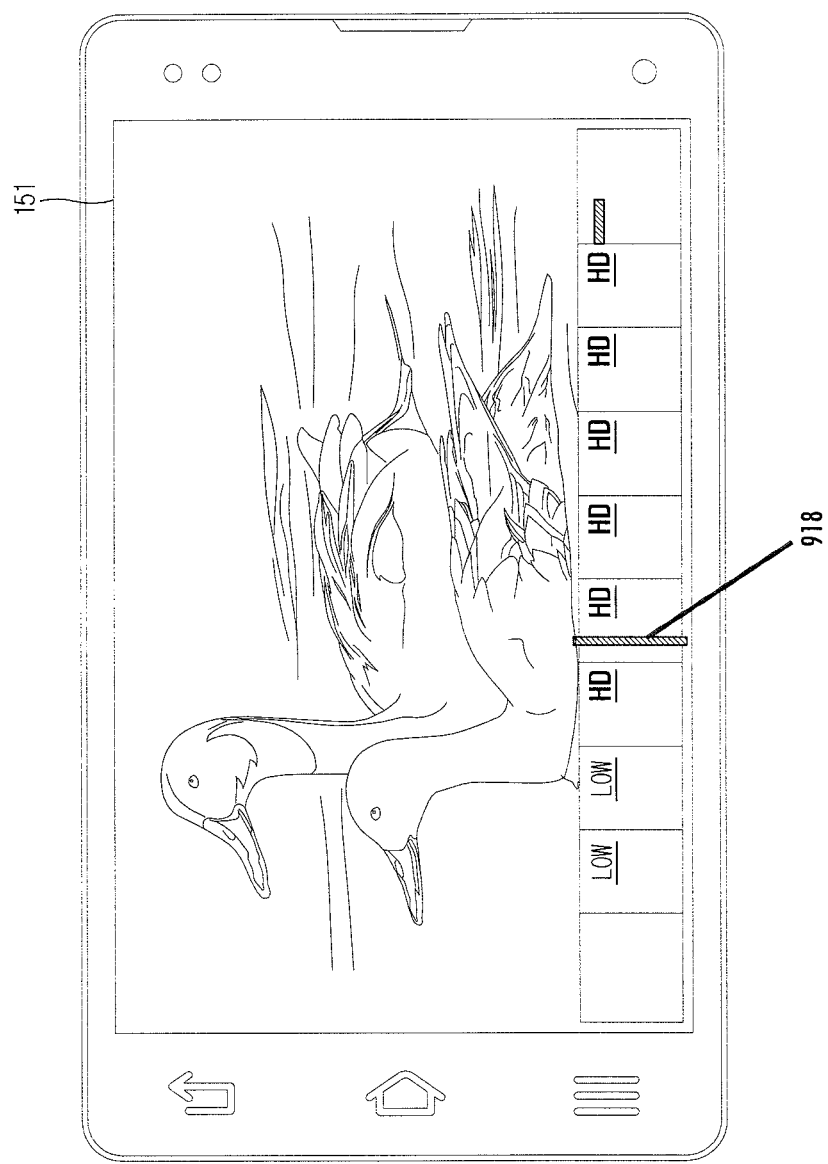

FIG. 12A
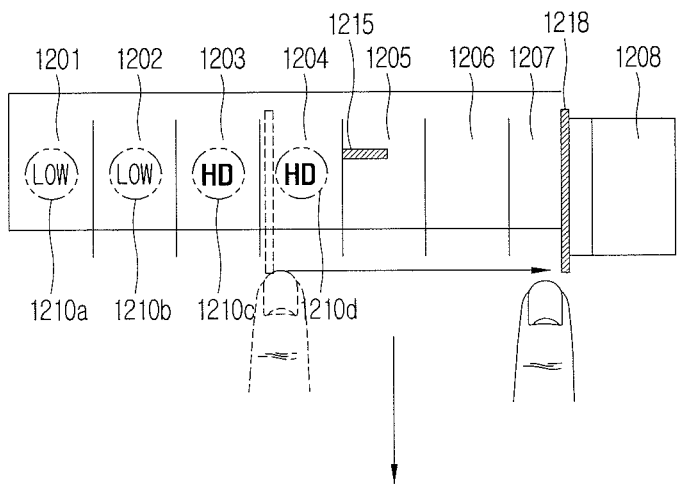
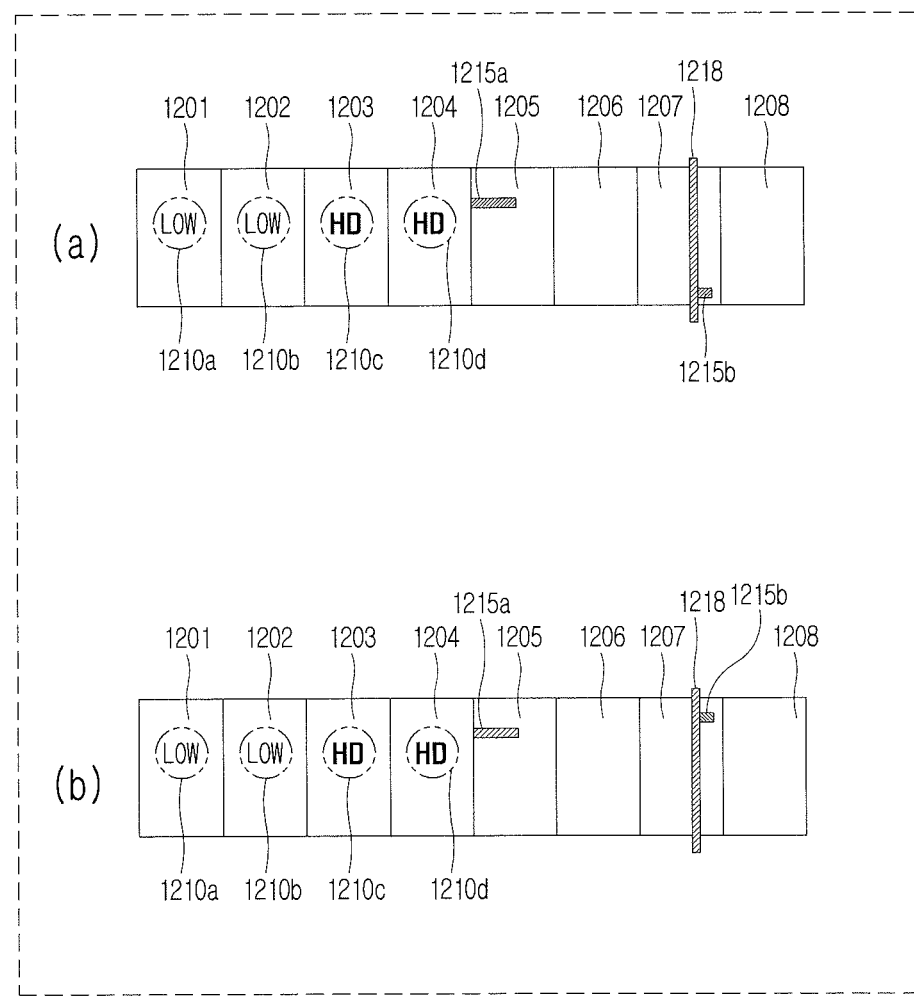

FIG. 12B
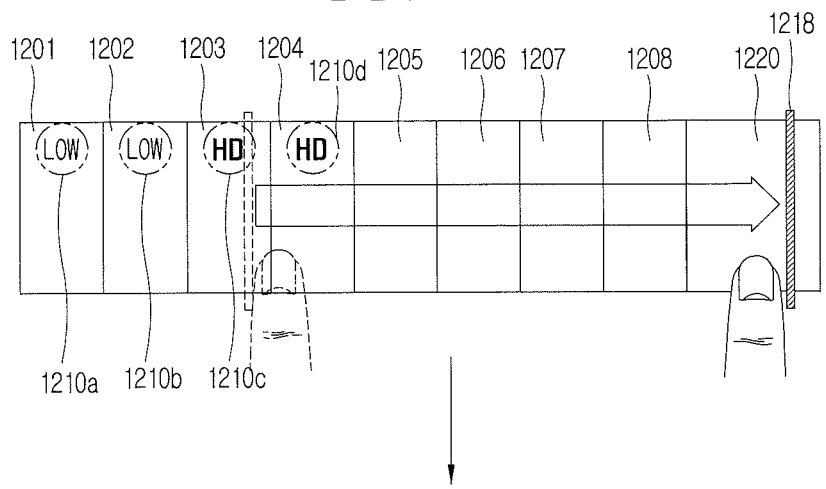
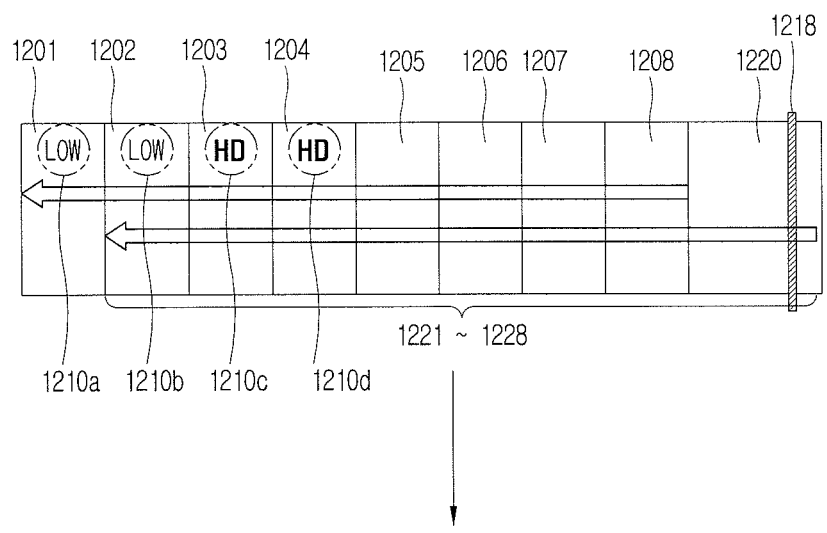
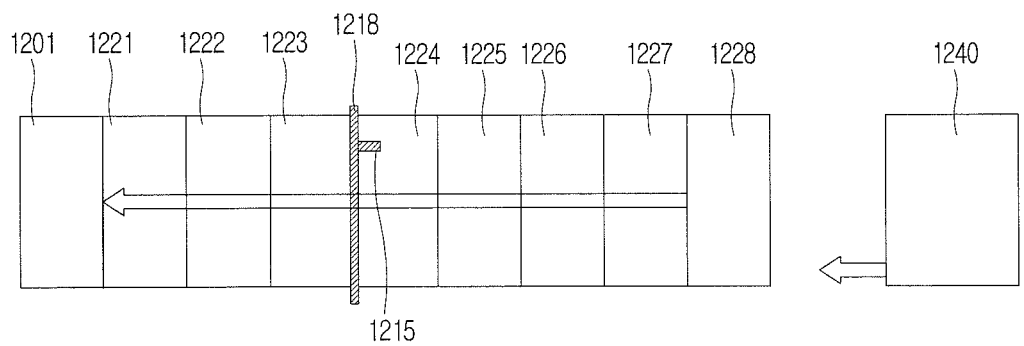

MOBILE TERMINAL AND METHOD OF CONTROLLING THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2013-0028207, filed on Mar. 15, 2013, the contents of which is incorporated by reference herein in its entirety.

BACKGROUND OF THE INVENTION

1. Field of the Invention

The present invention relates to a mobile terminal for downloading at least one content item from a content provision server and a method of controlling the mobile terminal.

2. Background of the Invention

In general, a terminal may be classified into a mobile (portable) terminal and a stationary terminal. The mobile terminal may be also classified into a handheld terminal and a vehicle mount terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Various attempts have been made to implement complicated functions in such a multimedia device by hardware or software.

Because the number of functions employed in the mobile terminal is increased in this manner, the mobile terminal supports a function of expanding functionality of the mobile terminal through communication with an external electronic apparatus and a content provision server.

SUMMARY OF THE INVENTION

Therefore, an aspect of the detailed description is to provide a mobile terminal for changing content quality using information on download of content that is downloaded from a content provision server and a method of controlling the mobile terminal.

Another aspect of the detailed description is to provide a mobile terminal for selecting ahead of time a different content associated with a content that is downloaded from a content provision server and thus immediately successively downloading or outputting the next content.

To achieve these and other advantages and in accordance with the purpose of this specification, as embodied and broadly described herein, there is provided a mobile terminal including a wireless communication unit that communicates with a content provision server over a network, a display unit that is possible to touch on and to which a first image object associated with content that is downloaded from the content provision server and a second image are output, and a controller that, in response to a movement of the second image object associated with the next downloadable content in such a manner as to be adjacent to the first image object, executes a control command to download the content corresponding to the second image object as soon as the content corresponding to the first image object is completely downloaded.

In the mobile terminal, in response to application of a touch gesture to the first image object, the controller executes the control command to change quality of the content corresponding to the first image object.

In the mobile terminal, the first image object may be made from multiple segments, a thumbnail image of the content that is downloaded may be output to each segment, and the second image may be the thumbnail image of the content associated with the content corresponding to the first image object.

In the mobile terminal, if a predetermined condition is met, the controller may perform control in such a manner that the first image object and the second image object are output to the display unit, and the predetermined condition here may be if at least one of a network status change event, a touch event with respect to the display unit, and a download completion event of the content occurs.

In the mobile terminal, an indicator indicating information on a network status and information on the quality of the content may be further displayed on the first image object, and if a first property indicating the information on the network status is changed in the indicator, the controller may change the quality of the content that is downloaded, based on a predetermined reference and changes a second property indicating the information on the quality of the content in the indicator.

In the mobile terminal, the indicator may further indicate progress information on the content that is downloaded.

In the mobile terminal, the controller may receive information on a network status, and may automatically change quality of the content that is downloaded, based on the received information on the network status.

In the mobile terminal, quality of the content may be determined by image quality of the content, the controller may change the image quality of the content that is downloaded, from a high state to a low state, if a first communication mode is changed to a second communication mode, and the controller may change the image quality of the content that is downloaded, from the low state to the high state, if the second communication mode is changed to the first communication mode.

In the mobile terminal, quality of the content may be determined by the number of frames of the content, and in order to download the content, the controller may set the number of frames of the content that is downloaded, to a predetermined maximum value, in the first communication mode and may set the number of frames of the content that is downloaded, to a predetermined threshold value, in the second communication mode.

In the mobile terminal, the first communication mode may be for a free-of-charge network, and the second communication mode may be for a pay network.

In the mobile terminal, the first communication mode may be for a case where a network connection state is good, and the second communication mode may be for a case where the network connection state is not good.

In the mobile terminal, in response to completion of the download of the content corresponding to the first image object, the controller may perform control in such a manner that a shape of the second image object that is output to the display unit 151 is changed and a highlighting effect is output.

In the mobile terminal, if the touch to the second image object is moved to a region on which the first image object is displayed, the controller may move the second image object in such a manner that the second image object comes into contact with one end of the first image object.

In the mobile terminal, the controller may further display a first controller indicating a location of the content that is currently output to the display unit, on the first image object.

In the mobile terminal, if the first controller is moved to one region of the image object by the touch, the controller may output or download a segment of the content corresponding to the one region, with content quality in the segment being set to content quality corresponding to a current network status.

In the mobile terminal, when the first image object is in contact with the second image object, in response to the touch to the display unit, the controller may output a second controller to a border region between the first image object and the second image object.

In the mobile terminal, if the second controller is moved to one region of the first image object by the touch, the controller may output thumbnail images of the content corresponding to the second image object to segments of the first image object in such a manner as to overlap the segments, or may enable the thumbnails images to push out the first image object and output the thumbnail image to the second image object.

In the mobile terminal, the controller may continue to perform the download, beginning with the segment of the content corresponding to the second image object corresponding to a location of the second controller.

In the mobile terminal, in response to application of a third touch gesture to the second image object, the controller may perform control in such a manner that third image objects associated with recommendation content items that are downloadable the next time are output.

In the mobile terminal, in response to application of a fourth touch gesture to any one of the second image object and the third image object, the controller may select a quality mode of the content that is downloadable the next time.

In the mobile terminal, if the touch to one segment of the first image object is dragged in a first direction, the controller may perform control in such a manner that the download is stopped, ending with the content segment corresponding to the one segment, and the first image object is separated into a first part and a second part, and the first part and the second part are output.

In the mobile terminal, when the first image object is separated into the first part and the second part, if the touch to the second part is dragged in a second direction, the controller may resume the stopped download and may bring the first part and the second part into contact with each other, thereby outputting the first image object.

To achieve these and other advantages and in accordance with the purpose of this specification, as embodied and broadly described herein, there is provided a method of controlling a mobile terminal that communicates with a content provision server over a network, comprising outputting a first image object associated with content that is downloaded from the content provision server, outputting a second image object associated with the content that is downloadable the next time, executing a first control command to change quality of the content that is downloaded, in response to a touch gesture to the first image object, and executing a second control command to download the content corresponding to the second image object as soon as the download of the content corresponding to the first image object is completed, in response to the touch gesture to the second image object.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram illustrating a mobile terminal according to one embodiment of the present invention;

FIG. 4 is a flowchart for describing a method of controlling the mobile terminal according to one embodiment of the present invention;

FIGS. 7A to 7F are diagrams for describing the control method in which the content associated with the content being downloaded is downloaded or output using a second image object, according to one embodiment of the present invention;

FIGS. 9A and 9B are diagrams for describing the control method in which the next content to be downloaded by the user gesture is successively downloaded at the time of completion of the content download, according to one embodiment of the present invention;

FIGS. 12A and 12B are diagrams for describing the control method in which the segment of the content to be currently output to a display unit is selected using the first image object and/or the second image object, according to one embodiment of the present invention.

DETAILED DESCRIPTION OF THE INVENTION

Figure 2A:
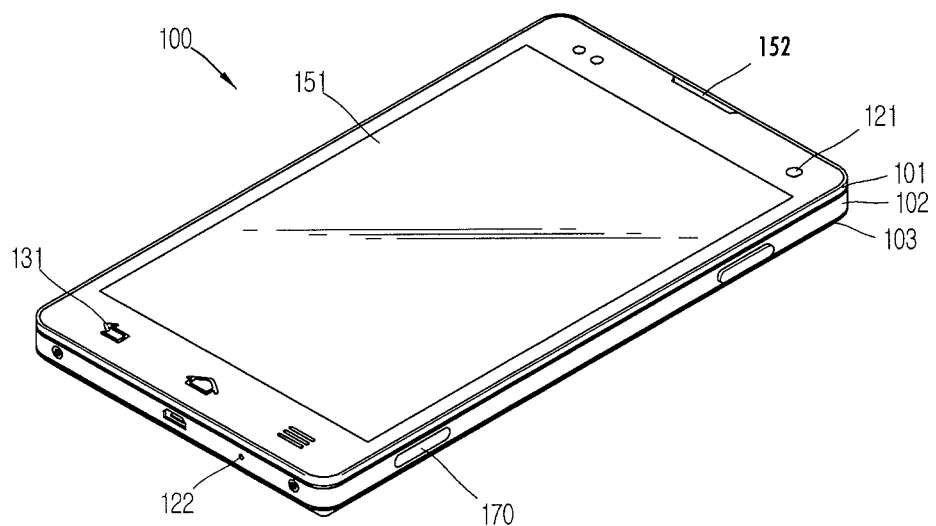
FIGS. 2A and 2B are perspective views, each illustrating an external appearance of the mobile terminal according to one embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

A mobile terminal according to an embodiment of the present invention may include a smart phone, a laptop computer, a digital broadcasting terminal, a Personal Digital Assistant (PDA), a Portable Multimedia Player (PMP), a navigator, a tablet, etc. However, it will be obvious to those skilled in the art that the present invention may be also applicable to a fixed terminal such as a digital TV, a desktop computer and other server, except for specific configurations for mobility.

FIG. 1 is a block diagram of a mobile terminal 100 according to an embodiment of the present invention. As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network. In this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), Zig-Bee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. Audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated when receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. The sensing unit 140 may also comprise a touch sensor for sensing a touch operation on the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area of a touch object, but also a touch pressure.

If the display unit 151 and a touch sensitive sensor (referred to as a touch sensor) have a layered structure therebetween, the structure may be referred to as a touch screen. The display unit 151 may be used as an input device rather than an output device. Such display unit 151 may be referred to as a 'touch screen'.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154 and a haptic module 155.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The audio output module 153 may output audio data received from the radio communication unit 110 or stored in the memory 160 in a call signal reception mode, a call mode, a record mode, a voice recognition mode, a broadcast reception mode, and the like. Also, the audio output module 153 may provide audible outputs related to a particular function (e.g., a call signal reception sound, a message reception sound, etc.) performed in the mobile terminal 100. The audio output module 153 may include a receiver, a speaker, a buzzer, etc.

The alarm unit 154 outputs a signal for informing about an occurrence of an event of the mobile terminal 100. Events generated in the mobile terminal may include call signal reception, message reception, key signal inputs, and the like. In addition to video or audio signals, the alarm unit 154 may output signals in a different manner, for example, to inform about an occurrence of an event. For example, the alarm unit 154 may output a signal in the form of vibration. The video signal or audio signal may be output through the display unit 151 or the audio output module 153. Therefore, the display unit 151 and the audio output module 153 may be categorized as part of the alarm unit 154.

The haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal 100 is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2B:
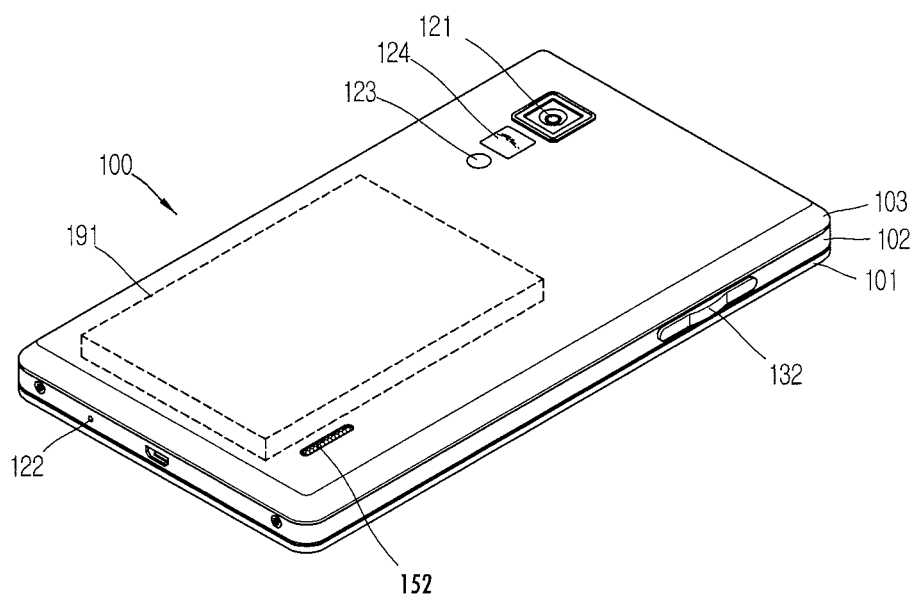

FIGS. 2A and 2B are perspective views showing the appearance of the mobile terminal 100 according to an embodiment of the present invention. In particular, FIG. 2A is a view showing a front surface and one side surface of the mobile terminal 100 in accordance with the present invention, and FIG. 2B is a view showing a rear surface and another side surface of the mobile terminal 100 of FIG. 2A.

As shown in FIG. 2A, the mobile terminal 100 is a bar type mobile terminal. However, the present invention is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti). At the front case 101, may be disposed a display unit 151, an audio output unit 152, a camera 121, a user input unit 130, a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the terminal body so as to rotate or pop-up.

A flash 123 and a mirror 124 may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the terminal body. The audio output unit 152' may cooperate with the audio output unit 152 disposed on a front surface of the terminal body so as to implement a stereo function. Also, the audio output unit 152' may be configured to operate as a speakerphone.

A broadcast signal receiving antenna as well as an antenna for calling may be additionally disposed on a side surface of the terminal body. The broadcast signal receiving antenna of the broadcast receiving module 111 may be configured to retract into the terminal body.

A power supply unit or battery 191 for supplying power to the mobile terminal 100 is mounted to the body. The power supply unit 191 may be mounted in the body, or may be detachably mounted to the body.

A touch pad for sensing touch may be additionally mounted to the rear case 102. Like the display unit 151, the touch pad may be formed to be light-transmissive. The touch pad may be also additionally mounted with a rear display unit for outputting visual information. Information output from the display unit 151 (front display) and the rear display can be controlled by the touch pad.

The touch pad operates in association with the display unit 151. The touch pad may be disposed on the rear surface of the display unit 151 in parallel. The touch pad may have a size equal to or smaller than that of the display unit 151.

Figure 3A:
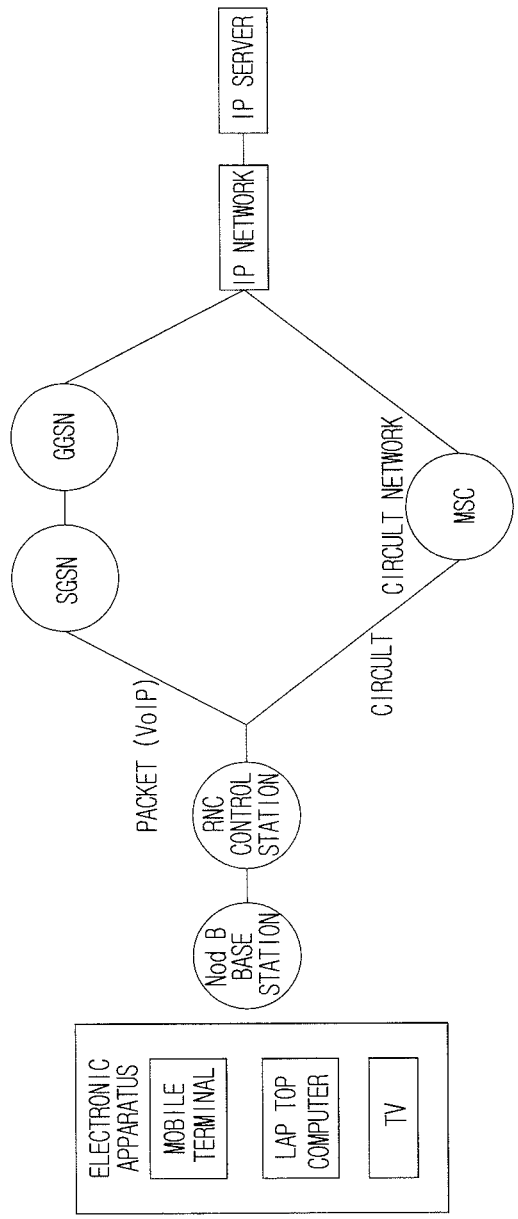
FIG. 3A is a diagram illustrating a communication network between the mobile terminal and a content provision server according to one embodiment of the present invention.

FIG. 3A is a diagram illustrating a communication network between the mobile terminal and a content provision server according to an embodiment of the present invention. The communication network between the mobile terminal and the content provision server is configured for an electronic apparatus and an Internet protocol (IP) server.

Referring to FIG. 3A, the mobile terminal includes all wireless communication-enabled electronic apparatuses, such as a PC, a mobile phone, tablet PC, a laptop computer, and a television.

The electronic apparatus transmits data to an RNC control station through a Nod B base station. A radio network controller (RNC) control station is also called a wireless network control station. The RNC control station performs a function for wireless resource management of an international mobile communication system that is of asynchronous type, and a function for management of the base station in a wireless subscriber network and management of an interface between a control unit in a wireless network and a unit in another network.

The data transmitted to the RNC control station is transmitted to IP server over the network. The network falls into categories, a packet network and a circuit network. That is, if when a wireless communication is established from the electronic apparatus to the IP server, the data is divided into smaller units called packets, and the packets are transmitted to the IP server along different transmission paths, this is defined as the transmission of the data to the IP server over the packet network. In this case, the data transmission path is commonly used by the other packets, at the time of the data transmission.

In contrast, if when the wireless communication is established from the electronic apparatus to the IP server, the data is transmitted to the IP server along the same transmission path from a starting time of the wireless communication to an ending time, the data is transmitted to the IP server over the circuit network. In this case, the predetermined data transmission path is exclusively used at the time of the data transmission.

At a more detailed level, the packet network includes a serving GPRS support node (SGSN) and a gateway GPRS support node (GGSN). Here, SGSN is called a packet switch support node. SGSN means a node that is responsible for data packet transfer with a mobile station within a service area. SGSN performs a packet routing and transmission function. A location register of SGSN stores a general packet radio service (GPRS), a user location information, a user profile (for example, an international mobile station identity (IMSI)) and others that are registered in SGSN.

Then, GGSN is also called a packet gateway support node. GGSN means a node that is responsible for a function of establishing a connection between a GPRS backbone network and an external packet data network. GGSN performs a function in which a GPRS packet received from SGSN is converted into a suitable packet data protocol (PDP) format, the result of the conversion is transmitted to the IP server, and a PDP address of arriving packet data is converted into a receiver address for the global system for mobile stations (GSM). In addition, GGSN stores a user SGSN address, and the user profile that are stored in the location register of SGSN.

On the other hand, the circuit network includes a mobile switching center (MSC). MSC control is also called a mobile switching center, and controls the entire system. Specifically, MSC selects the transmission path along which the data received from the RNC control station is transmitted to the IP server. To do this, MSC performs a control function necessary for mobility of the electronic apparatus and efficient administration of frequency resources. In addition, MSC processes a signal that transmits to and from a Nod B base station and performs a central control function of making the adjustment in such a manner that the Nod B station is efficiently administered.

As described above, the data is transmitted from the electronic apparatus through the Nod B base station to the RNC control station, and the data transmitted to the RNC control station is transmitted to the IP server over the packet network and the circuit network.

Figure 3B:
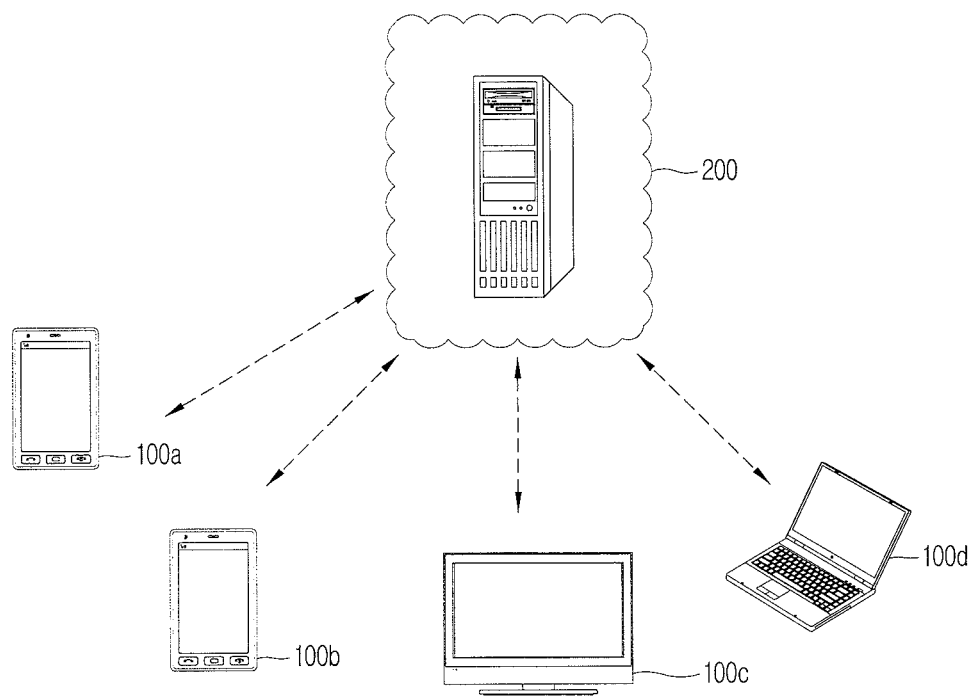
FIG. 3B is a diagram illustrating the mobile terminal according to one embodiment of the present invention and the content provision server.

FIG. 3B is a diagram illustrating the mobile terminal according to one embodiment of the present invention and a content provision server. As illustrated in FIG. 3B, a content provision server 200 and at least one electronic apparatus 100a, 100b, 100c, or 100d are included.

Here, the electronic apparatus may be at least one of the mobile terminal, the laptop computer, the television, and the wireless communication-enabled electronic apparatus.

The content provision server 200 corresponds to a server that has a large scale database that integrates and provides various kinds of information stored in the electronic apparatuses 100a, 110b, 100c, and 100d that are present at physically-different locations, using a virtualization technology. The content provision server 200 can perform distributed processing on the data, stored in the large scale database, in Internet virtual data centers, and can then reprocess the data, or transmit the data to at least one electronic apparatus 100a, 100b, 100c, or 100d. That is, the content provision server 200 stores software and data in a data central computer (or a central server) connected over the Internet. Accordingly, if a user has access to the content provision server 200 through the electronic apparatus, the software or the data stored in the central computer is provided back to him/her at any time.

On the other hand, each of the electronic apparatuses 100a, 100b, 100c, and 100d connecting to the content provision server 200 includes at least one wireless communication protocol and connects to the content provision server 200 through the wireless communication unit. The electronic apparatuses 100a, 100b, 100c, and 100d and the content provision server 200 can connect to each other over the wireless network. At least one of the communication methods using a wireless-fidelity (Wi-Fi) technology, a third generation (3G) technology, a fourth generation (4G) technology, a digital living network alliance (DLNA), a near field communication (NFC) technology and a Bluetooth (BT) technology is employed to establish a connection between each of the electronic apparatuses 100a, 100b, 100c and 100d and the content provision server 200 over the wireless network.

On the other hand, the connection between the content provision server 200 and the electronic apparatus here is also expressed as mutual pairing, mutual synchronization, or mutual communication between each of the electronic apparatuses 100a, 100b, 100c, and 100d and the content provision server. This means a state where information can be transmitted between each of the electronic apparatuses 100a, 100b, 100c and 100d and the content provision server 200, that is, a state where the connection is established to transmit effective data.

The connection between the content provision server 200 and each of the electronic apparatuses 100a, 100b, 100c, and 100d is established based on a request from at least one of the content provision server 200 and each of the electronic apparatuses 100a, 100b, 100c, and 100d. In addition, the content provision server 200 can connect to the multiple electronic apparatuses 100a 100b, 100c, and 100d at the same time, and the information received from one electronic apparatus can be transmitted to another electronic apparatus, based on a request of the user. In addition, according to the embodiment of the present invention, the content provision server 200 may be a cloud server.

Figure 5:
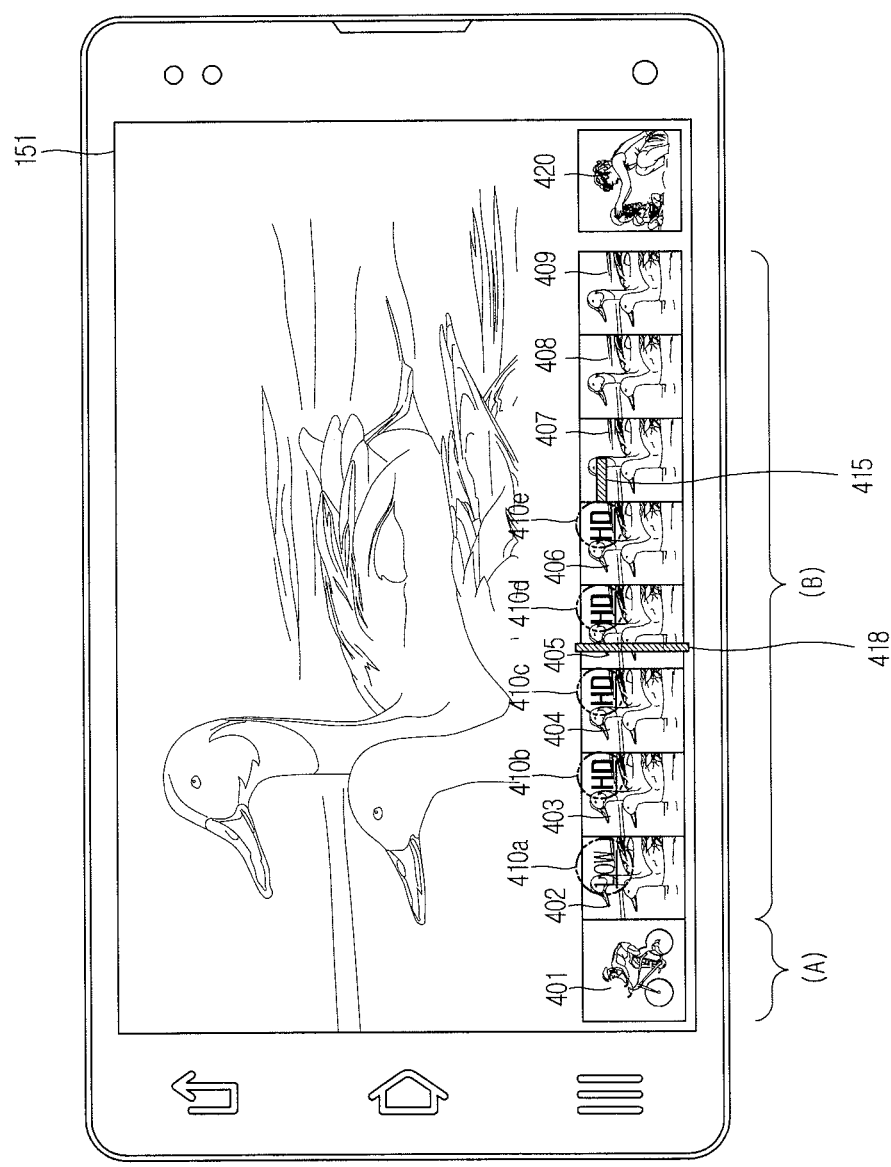
FIG. 5 is a diagram for describing the control method in FIG. 4.

A method of controlling download using thumbnail images of the content that is downloaded from the content provision server is described below referring to FIG. 1, FIG. 3B, FIG. 4, and FIG. 5. FIG. 4 is a flowchart for describing a method of controlling the mobile terminal according to one embodiment of the present invention. FIG. 5 is a diagram for describing the control method in FIG. 4.

In the embodiment that follows, the mobile terminal, as an example of the electronic apparatus, is described below, and the mobile terminal includes at least one of the constituent elements described referring to FIG. 1, and FIGS. 2A and 2B.

First, referring FIG. 1, FIG. 3B, and FIG. 4, the mobile terminal 100 according to the embodiment of the present invention outputs a first image object associated with the content that is downloaded from the content provision server 200 (S410).

At this time, as a step that precedes Step S410, a wireless communication unit 110, for example, connects to a content provision server 200 that provides various content items over the network such as the Internet. For example, the mobile terminal 100 transmits a service request message for requesting for information on selected specific content, for example, an HTTP request message to a web server, and the web server provides the mobile terminals 100 with a response message including a location of the content provision server 200 and a name of the content corresponding to the HTTP request message, Thus, the mobile terminal 100 connects to the content provision server 200.

When connecting in this manner, the mobile terminal 100 transmits a request for download of the corresponding content to the content provision server 200 in order to download the specific content selected through a user input. The content that is downloaded from the content provision server 200 includes various types of data, for example, video data (moving images and images), audio data, software, electronic documents and the like.

In addition, the mobile terminal 100 is provided with at least one thumbnail image associated with the content of which the download is requested, from the content provision server 200. Specifically, the content provision server 200 provides at least one thumbnail image in such a manner that the selected content, for example, a moving image file, is extracted in frames at a constant interval of time and the extracted frames are sequentially transmitted to the mobile terminal 100.

The thumbnail image here is an image in which the specific detail or image of the content is reduced from its original size. For example, the method in which the thumbnail image is generated in this manner is categorized into two types. One is to decode video frames encoded in MPEG format and then reduce directly the decoded frames. The other is to decode video frames encoded in MPEG format and then use a DV value of an intra-frame.

In addition, the frame here includes a header and data. The frame is categorized into three types: an Intra (I) frame, a predictive (P) frame, and a bi-directional predictive frame. The frame is basically structured from the header and the data, the three frames described above are different in terms of the definition of the header. Here, the frame extracted by the content provision server 200 is not limited to a specific type.

On the other hand, the first image object that is output to one region of the display unit 151 in Step S410 is made from multiple segments, and the thumbnail image of the content that is downloaded is output to each segment. Here, the thumbnail image of the content, as described above, is provided by the content provision server 200.

Referring to FIG. 5, a first image object is output to one region of the display unit 151, for example, the lower region, and is made from segments 401 to 409. The thumbnail image of the content that is downloaded is output to each of the segments 401 to 409 corresponding to the segments of the content. In addition, the first segment A of the first image object corresponds to the content that has been downloaded, and the following segments B corresponds to the content that is being downloaded or just completed being downloaded.

Referring further to FIG. 5, textual information items 410*a* to 410*e* on the quality of content in the segments are displayed on the segments 402 to 406. In addition, an indicator 418 indicating a location of the content being currently displayed on the display unit 151 is displayed on the first image object.

In addition, an indicator 415 indicating the extent to which the download has progressed is displayed on one segment 407 of the first image object. Here, information indicating if the network in current use is a pay network or a free-of-charge network and information on the image quality of the content that is downloaded are further included in the indicator 415 indicating the extent to which the download progresses.

A second image object 420 associated with the next downloadable content is output to one region of the display unit 151 (S420). Here, the second image object 420 refers to the thumbnail image of the content associated with the content corresponding to the first image object.

For example, the content prepared based on predetermined reference is selected, such as the other content successively downloaded by the user who downloaded the content corresponding to the first image object, the content in succession to the content corresponding to the first image object, and the content recommended as a result of analyzing a user preference.

In addition, the first image object and the image object that are output to the display unit 151 vary in at least one of size, shape, and output region, depending on a user input or settings that are provided in advance.

In FIG. 5, the example is illustrated in which the second image object 420 is output separate to and in parallel with the first image object 401 to 409, but the present invention is not limited to this arrangement. For example, the image object 420 may be output to the upper end of the display unit 151.

Further, the controller 180 presets a condition for outputting the first image object and the second image object to the display unit 151. Thus, if the predetermined condition is met, the controller 180 enables the first image object and the second image object to be output to the display unit 151. The predetermined condition can be if at least one of a network status change event, a touch event with respect to the display unit 151, and a download completion of the content event occurs.

In addition, points in time when the first image object and the second image object are output to the display unit 151 differ from each other depending on the condition described above. For example, if the network status change event occurs, only the first image object is output, and if the touch event with respect to the display unit 151 or the content download completion event occurs, the first image object and the second image object are all output.

If the first image object and the second image object are output in this manner, and a touch gesture with respect to the first image object is detected, the controller 180 executes a first control command to change the quality of the content that is downloaded (S430). Here, the touch gesture with respect to the first image object includes a touch gesture with a specific segment (or region) of the first image object, a touch gesture using a controller that is output to the first image object, a touch gesture in a specific direction and others.

For example, if the segment 407 in which the download is in progress is touched in a first direction (for example in a downward direction), the controller 180 outputs or downloads the content with the quality being set to high quality (for example, high definition).

In contrast, if the segment 407 in which the download is in progress is touched in a second direction (for example in an upward direction), the controller 180 outputs or downloads the content with the quality being set to low quality (for example low definition).

For example, in FIG. 5, the controller 180 changes the quality of the content that is output or downloaded from low definition to high definition (HD), in response to the movement of the indicator 418 indicating the location of the content that is currently output to the display unit 151 to a specific segment 402. On the other hand, if the user wants to view the content corresponding to the specific segment 402 to which the indicator 418 is moved, the controller 180 changes the content quality from high definition (HD) to low definition, and immediately displays the content with high definition on the display unit 151.

In this manner, when the first image object and the second image object are output to the display unit 151, the controller 180 executes a second control command to download the content corresponding to the second image object immediately after the content corresponding to the first image object is downloaded, in response to the movement of the second image object to the first image object in such a manner as to be adjacent to the first image object (S440).

For example, if the touch gesture that brings the second image object output to the display unit 151 into contact with the first image object is detected, the controller 180 executes the second control command. In another example, immediately after the content corresponding to the first image object is completely downloaded, the controller 180 executes the second control command while automatically moving the second image object toward the first image object.

As described above, according to the embodiment of the present invention, the quality of the content that is downloaded from the content provision server is selectively changed, and thus the flexible selection of the content quality is possible, and the pre-selection of an associated different content is possible for buffering. Therefore, the waiting time can be reduced in outputting or downloading the different content.

Figure 6:
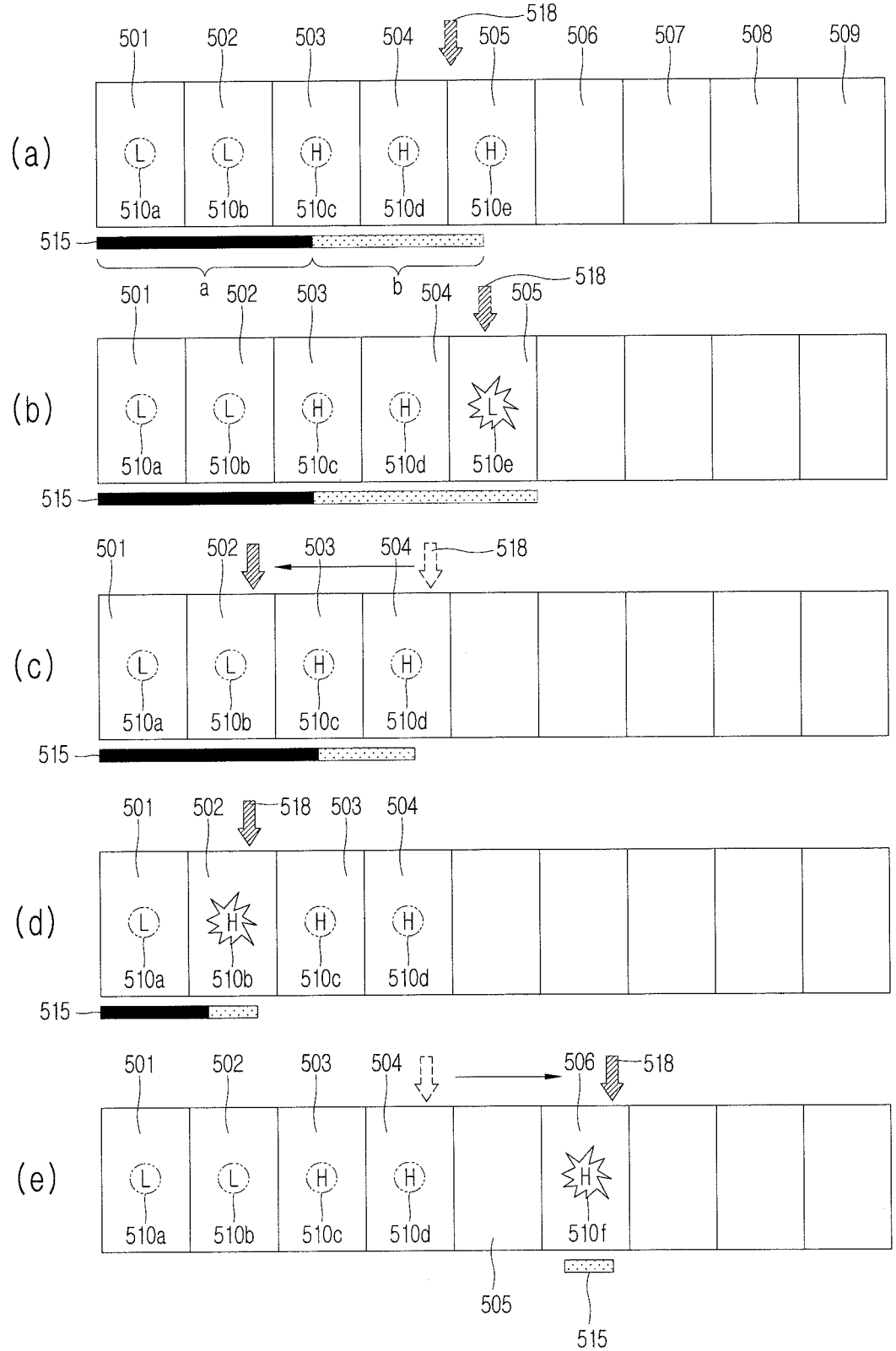
FIG. 6 are diagrams for describing the control method in which a specific segment of content with content quality depending on a current network status is downloaded or output using a first image object, according to one embodiment of the present invention.

A control method to change the content quality depending on the current network status is described in detail below referring to FIG. 1, FIG. 3B, and FIG. 6. FIG. 6 are diagrams for describing an example in which the specific segment of content is downloaded or output with the content quality depending on the current network status using the first image object, according to one embodiment of the present invention.

First, in FIG. 6(*a*), the thumbnail image corresponding to the first image object is output in each of the segments 501 to 508 of the first image object. In addition, an indicator 515 indicating progress information on the content download is displayed on the first image object. In addition, information items 510*a* to 510*e* on the content quality are displayed on the segments 501 to 505 in which the downloads have been completed in the first image object. For example, if the content quality is at low definition, "L (or Low)" is displayed, and if the content quality is at high definition, "H (or HD) is displayed.

The controller 180 receives information on the network status with respect to the content provision server 200, and automatically changes the quality of the content that is downloaded, based on the received information on the network status. For example, in FIG. 6(*b*), if a failure occurs in the network status while downloading the content with high definition ("H") in the segment 505 of the first image object, the controller 180 downloads the content corresponding to the segment 505 with low definition ("L").

If the content quality is determined by image quality of the content, when the network status is changed from a first communication mode to a second communication mode, the controller 180 changes the image quality of the content that is downloaded, from a high definition state to a low definition state. In contrast, when the network status is changed from the second communication mode to the first communication mode, the controller 180 changes the image quality of the content that is downloaded, from the low definition state to the high definition state.

The "communication mode" includes, for example, a "3G communication mode, "4G communication mode," or a "Wi-Fi communication mode" and others. That is, the communication mode indicates to which wireless communication network a wireless communication unit 110 is connected. For example, if connected to the 3G communication network, the mobile terminal 100 is expressed as being set to the 3G communication mode.

In addition, if the first communication mode is for the free-of-charge network, for example, a 3G network, the second communication mode can be for the pay network, for example, a Wi-Fi network. Further, if the first communication mode is for the network in a good connection state, the second communication mode is for the network can be in a bad connection state. The network in the bad connection state includes when the network connection ceases due to the failure.

If the content quality is determined by the number of frames of the content, in order to download the content, the controller 180 sets the number of frames of the content that is downloaded, to a predetermined maximum value (for example 60 frames per second), in the first communication mode (for example the network connection state is good), and sets the number of frames of the content that is downloaded, to a predetermined threshold value (for example 15 frames per second), in the second communication mode (for example the network connection state is bad).

If the quality of the content corresponding to the specific segment of the first image object is changed depending on a change in the network state, the controller 180 further outputs a predetermined alarming effect to the corresponding segment. For example, if the content quality is changed from "H" to "L" in the segment 505 in FIG. 6(*b*), a highlighting effect is output to around the object 510*e* indicating the information on the content quality, or makes the thumbnail image of the corresponding segment 505 zoom up and outputs the zooming-up thumbnail image.

In addition, the controller 180 outputs a first controller 518 indicating the location of the content output to the display unit 151, which moves depending on the touch, to the first controller 518. If, depending on the touch, the first controller 518 is moved to one region of the first image object, the controller 180 downloads the content, with the content quality of the segment of the content corresponding to the one region being set to the content quality corresponding to the current network status.

For example, in FIG. 6(*c*), in response to the movement of the first controller 518 located in the segment 504 to one region 502 while the download is in progress in the segment 504 with the content quality being set to high definition because the current network status is effective (or because the connection state is good), the controller 180 changes the content quality in the segment 502 from low definition to high definition (from "L" to "H"), and thus outputs and/or downloads the content.

In response to the change in the content quality in the segment 502 in this manner, the controller 180 outputs the highlighting effect to around the object 510*b* and changes the textual information indicating the content quality (from "L" to "H") as shown in FIG. 6(*d*). Along with this, the controller 180 resumes the download, beginning with the segment of the content corresponding to the segment 502 to which the first controller 518 is moved.

In addition, for example, in FIG. 6(*e*), in response to the movement of the first controller 518 located in the segment 504 to one region 506 while the download is in progress in the segment 504 with the content quality being set to high definition because the current network status is effective (or because the connection state is good), the controller 180 outputs and/or downloads the content with the content quality in the segment 506 being set to high definition ("H"). At this time, the download skips with respect to the segment 505 in which the download has not yet occurred.

If the current network status is good, the first controller 518 of the first image object is moved to the different region in this manner, and thus the segment in which the download is in progress with low definition is automatically changed to the segment in which the output and the download are possible with high definition and the segment in which the output and the download are not wanted skips. This satisfies user's various needs.

The control method is described above in which the information on the quality of the content that is downloaded depending on the network status is displayed on each segment, and if the current network status is good, the segment selected by the user is automatically outputted and downloaded with high definition.

Figure 7A:
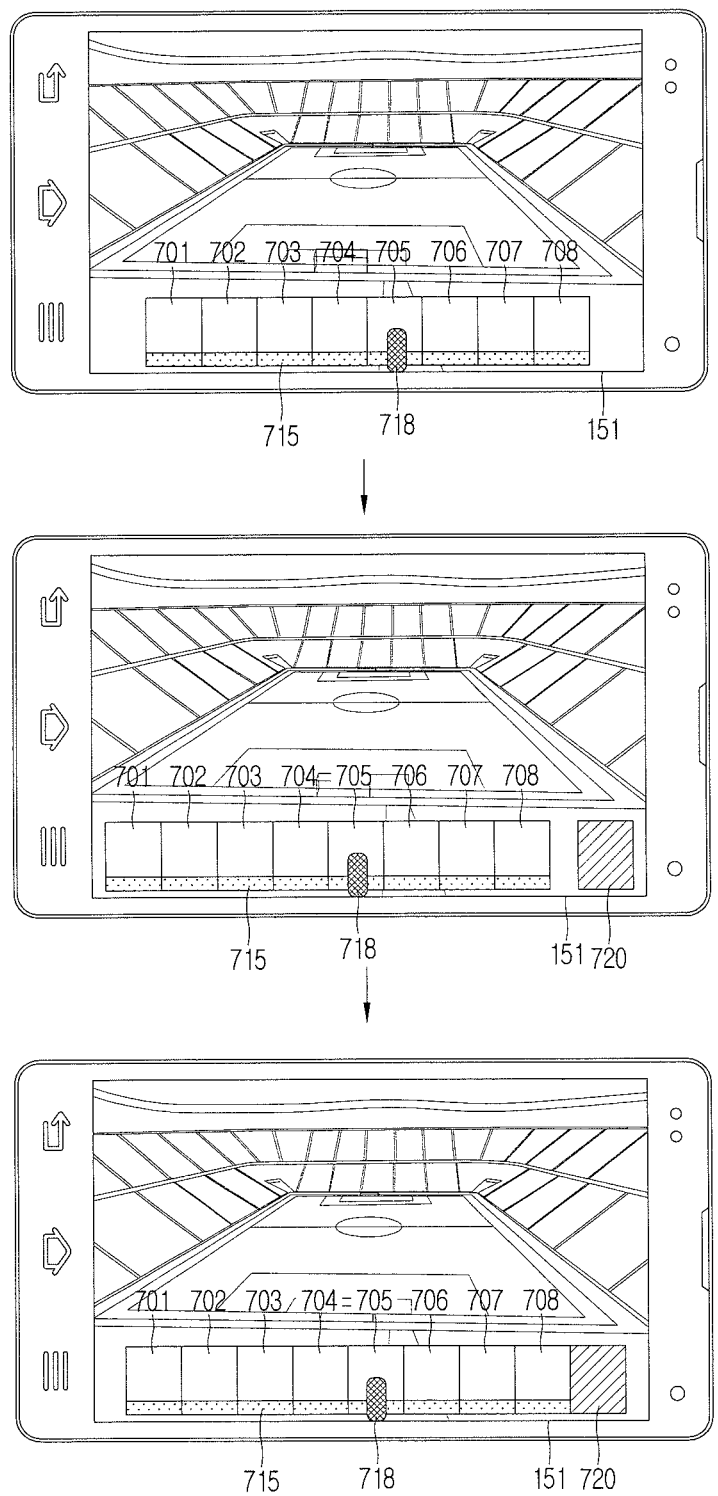
Figure 7B:
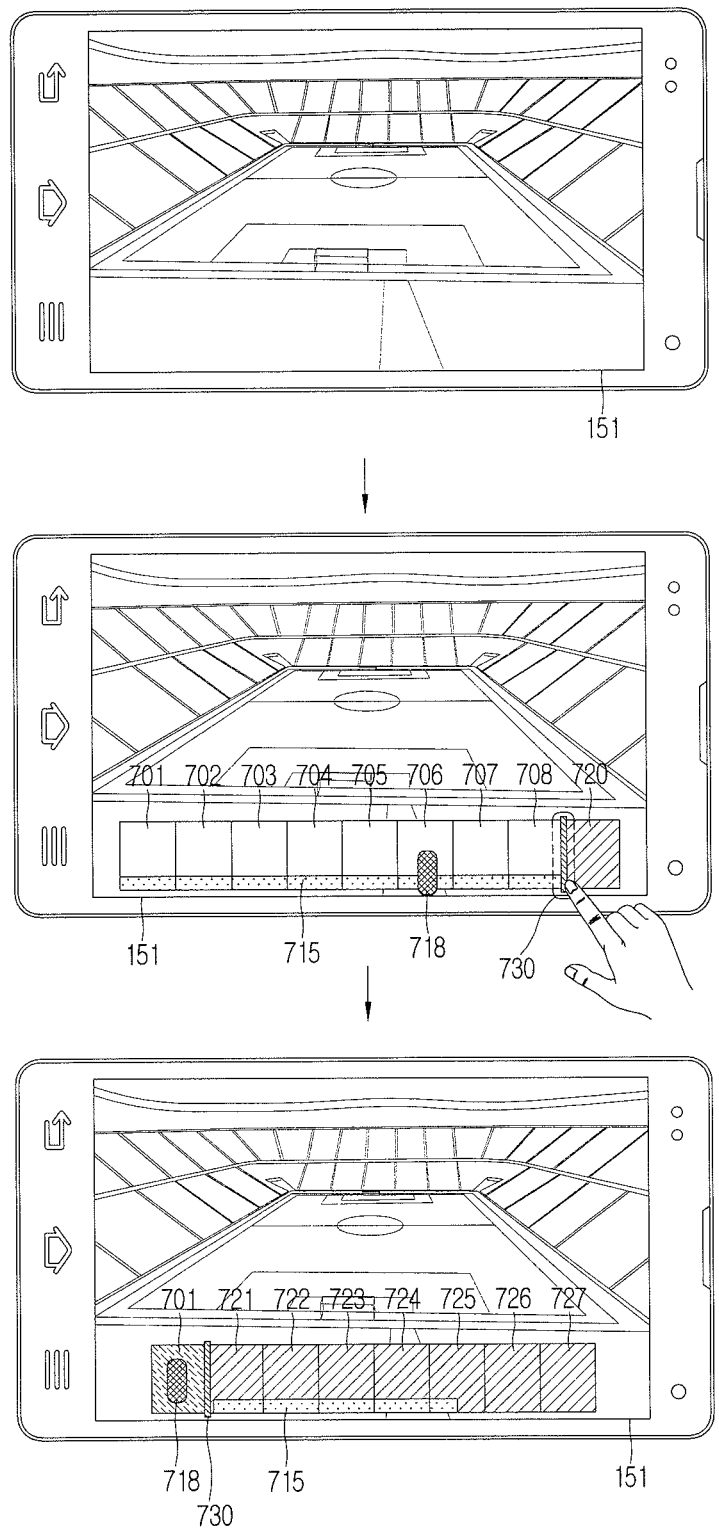
Figure 7C:
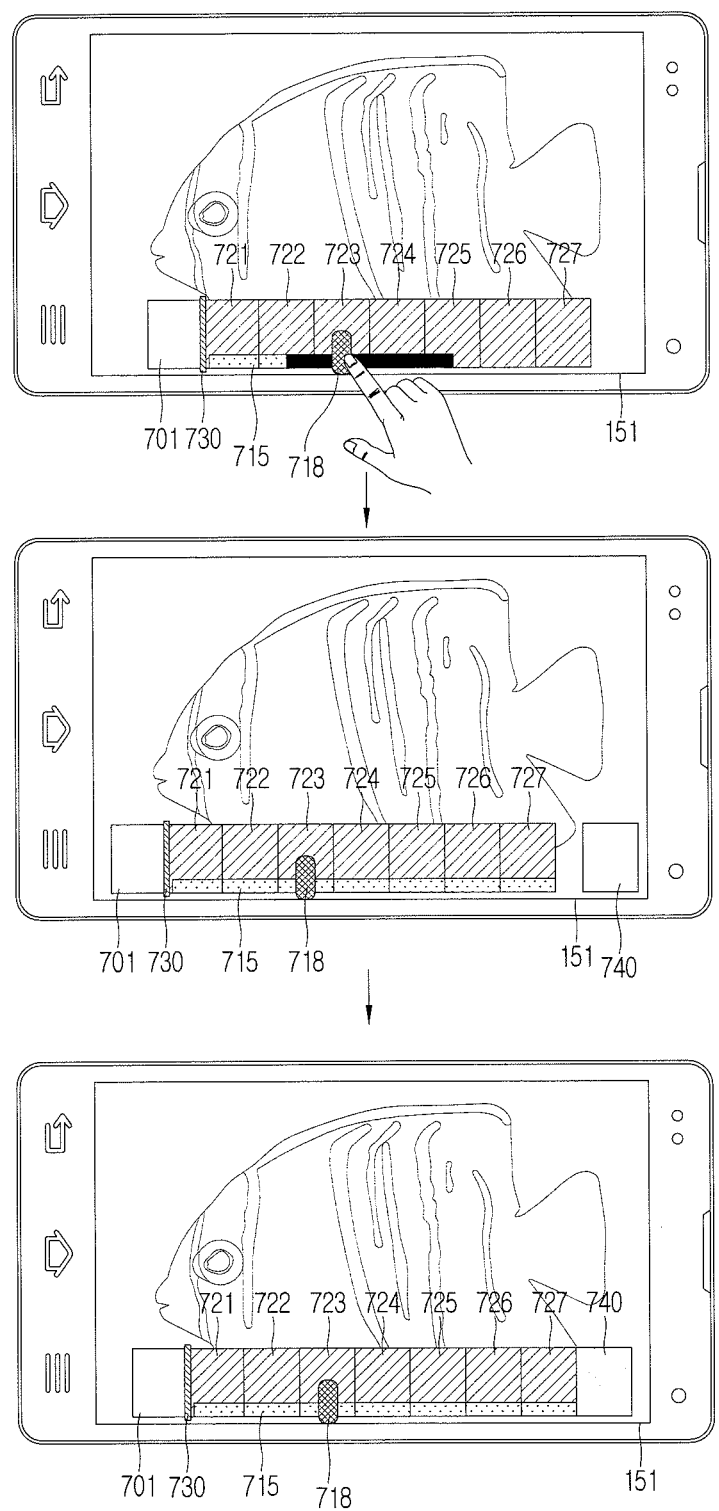
Figure 7D:
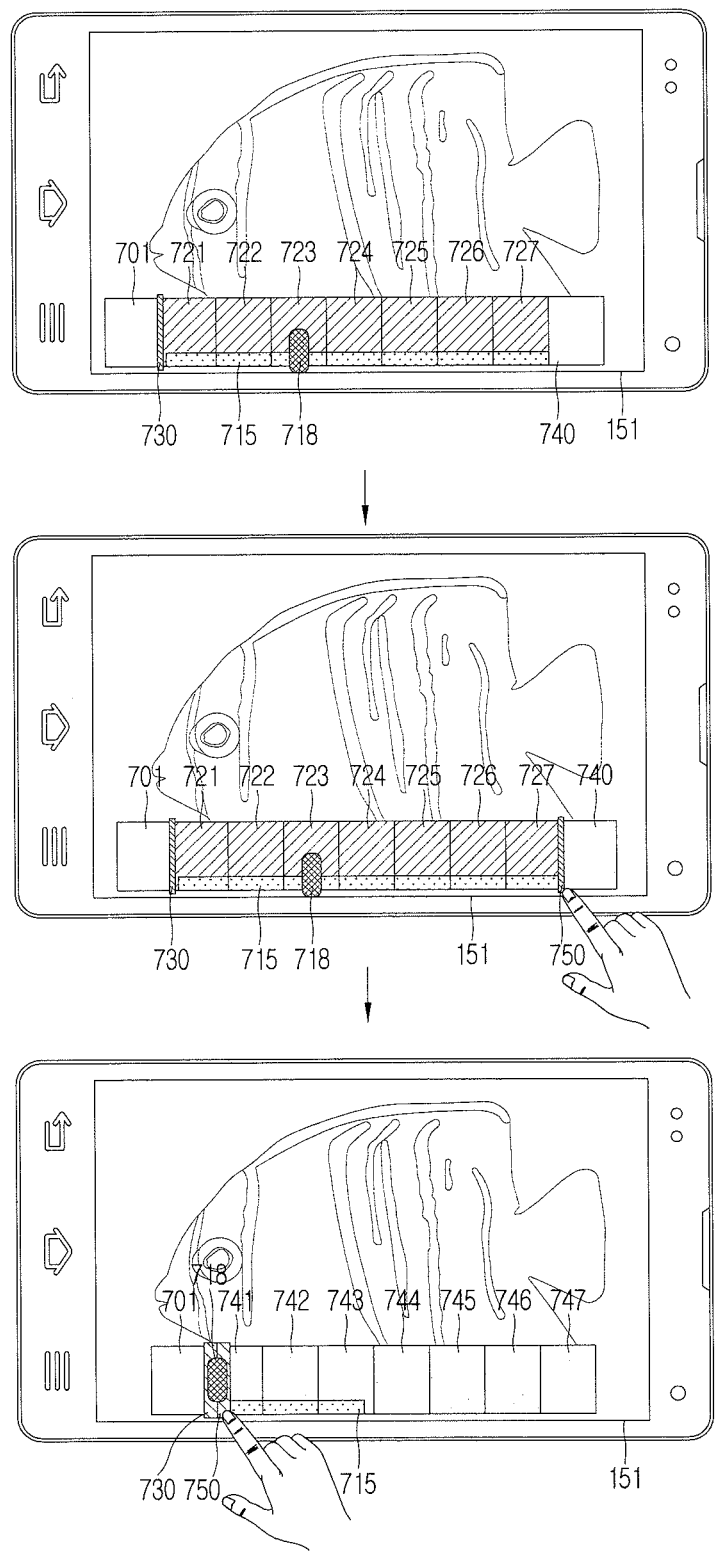
Figure 8:
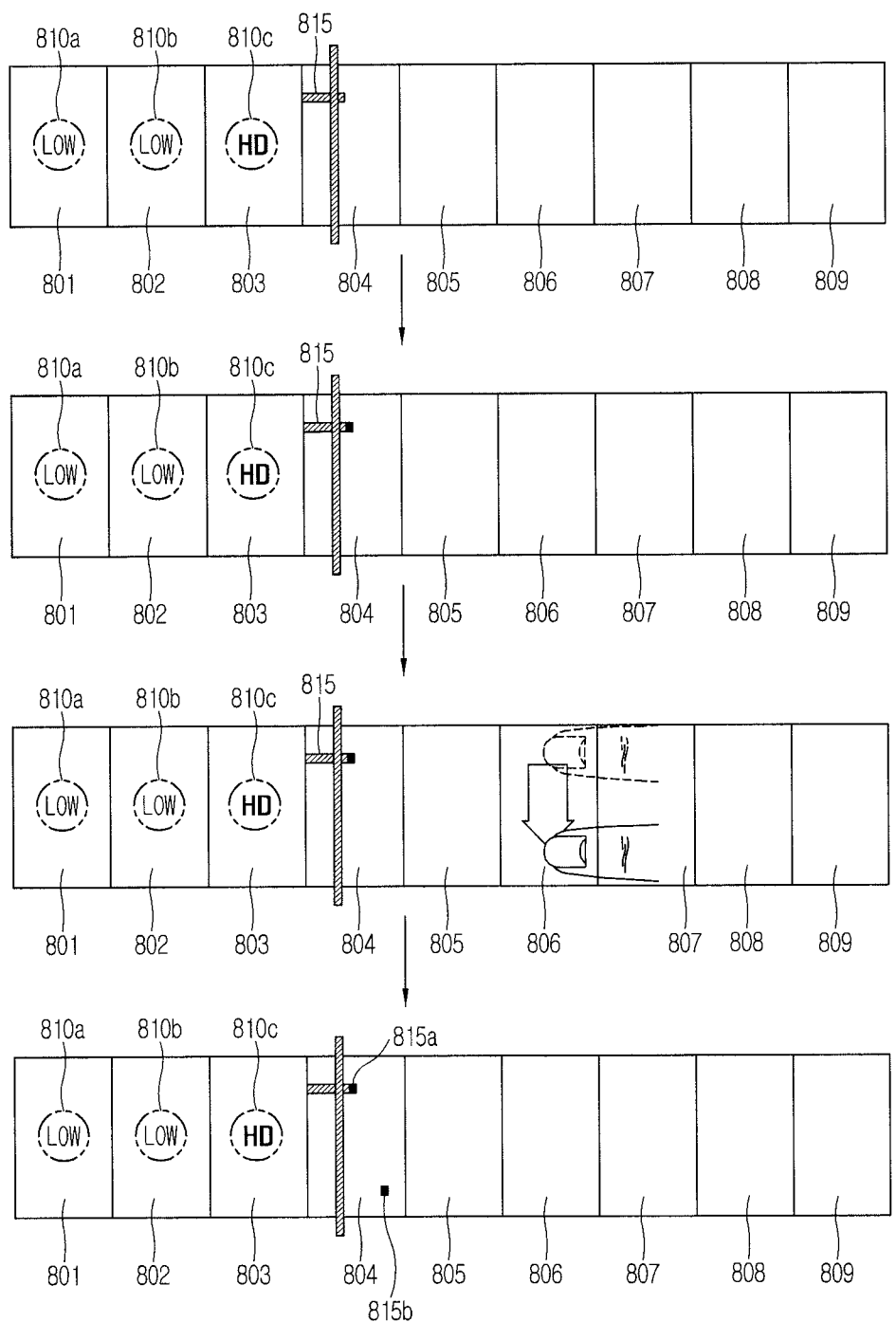
FIG. 8 is a diagram for describing a method of selecting the quality of the content that is downloaded by a user gesture at the time of a change in the network status according to one embodiment of the present invention.

Next, referring FIG. 1, FIG. 3B, and FIG. 8 (FIG. 7 will be described later), a control method is described in which the user selectively checks the network status and changes the quality of the content that is downloaded. In particular, FIG. 8 is a diagram for describing a method of selecting the quality of the content that is downloaded by a user gesture at the time of a change in the network status according to one embodiment of the present invention.

When the first image object is output on the display unit 151 according to the predetermined condition, the controller 180 further displays the indicator, which indicates the information on the network status and the information on the content quality at the same time, on the first image object. For example, in FIG. 8, in an indicator 815 having a "length" indicating the extent to which the download progresses, a "color" indicating the quality of the content that is downloaded, and a "location" indicates whether the network in current use is the free-of-charge network (for example the 3G network) or the pay network (for example the Wi-Fi network).

In response to the change of a first property (for example the color) indicating the information on the network status in the indicator 815, the controller 180 changes the quality of the content that is downloaded according to the predetermined reference, and correspondingly changes a second property (for example the location) indicating the information on the content quality in the indicator 815.

Here, the predetermined reference includes both a setting that is provided by a setting unit so if the network status is changed, the quality is automatically changed to the corresponding content quality, and a setting that is provided by a touch to the indicator 815. The correspondingly automatic change of the content quality depending on the change in the network status is described above, and therefore a method of changing the content quality by the touch to the first image object is described below.

For example, in FIG. 8, in response to the change of the network in current use from the free-of-charge network to the pay network, the controller 180 changes the color of the indicator 815, for example, from blue (a) to red (b) and displays the result of the change. In response to the fact that the user visually ensures that the color of the indicator 815 is changed and then touches on the indicator 815 in the first direction (for example in the downward direction), the controller 180 changes the quality of the content that is downloaded, from high definition to low definition.

In addition, in response to the application of a flicking touch input in the first direction (for example in the downward direction) to the indicator 815, the controller 180 changes the location of the indicator 815, for example, from "upper" 815a to "lower" 815b, and displays the result of the change. Then, thereafter, the controller 180 continues to download the content with the content quality being set to low definition.

Further, the same can be true when the network in current use is changed from the pay network back to the free-of-charge network, and therefore a description of the case is omitted. In addition, if the content quality is determined by the image quality of the content, when the network in current use is changed from the first communication mode to the second communication mode, the controller 180 detects the flicking touch input in the first direction (for example the downward direction) to the indicator 815 and thus changes the image quality of the content that is downloaded, from a high state to a low state.

In another example, if the content quality is determined by the number of frames of the content, the controller 180 detects the flicking touch input in the upward direction to the indicator 815 in the first communication mode (for example in a case where the network connection state is good) and thus sets the number of frames of the content that is downloaded, to a predetermined maximum value. In addition, the controller 180 detects the flicking touch input in the downward direction to the indicator 815 in the second communication mode (for example in a case where the network connection state is not good) and thus downloads the content with the number of frames of the content being set to a predetermined threshold value.

If the content quality is determined by the number of frames of the content in this manner, the controller 180 further displays frames-per-second (FPS) information on the content on the segments of the first image object. If the user wants to speedily download the content in this case, he/she can change FPS information on the content that is downloaded, by the touch input (for example the flicking touch input) to the indicator indicating the FPS information, regardless of the network status.

In response to the application of the flicking touch input in the first direction (for example in the downward direction) to the indicator indicating the FPS information, the controller 180 decreases the number of frames of the content that is downloaded, as much as the number of times that the flicking touch input is applied or changes the number of frames of the content that is downloaded, to the predetermined threshold value (for example 15 frames per second). By doing this, the controller 180 downloads the content and correspondingly changes the display of the indicator indicating the FPS information, thereby displaying the result of the change.

In contrast, if the flicking touch input in the second direction (for example in the upward direction) is applied to the indicator indicating the FPS information, the controller 180 downloads the content by increasing the number of frames of the content that is downloaded, as much as the number of times that the flicking touch input is applied (for example maximum 60 frames per second) and correspondingly changes the display of the indicator indicating the FPS information, thereby displaying the result of the change.

In this manner, the flexible selection of the content quality by the user is possible by enabling him/her to selectively change the quality of the content that is downloaded, depending on the displayed network status.

Next, referring to FIG. 1, FIG. 3B, FIGS. 7A to 7F, and FIGS. 9A and 9B, a control method is described, in which a different content associated with the content that is currently downloaded is output and/or downloaded in succession to the currently downloaded content. In particular, FIGS. 7A to 7F are diagrams for describing the control method in which the content associated with the content is downloaded or output using the second image object, according to one embodiment of the present invention.

If the content corresponding to the first image object, as illustrated in FIG. 7A, is completely downloaded, the controller 180 enables the first image object 701 to 708 and the second image object 720 to pop up on one region of the display unit 151. At this time, in response to the completion of the download of the content corresponding to the first image object, the controller 180 changes a shape of the second image object output to the display unit 151 and the highlighting effect is output.

For example, the second image object of which the size is different from that of the previous second image object is output, or a blinking effect is displayed around the second image object. This provides the user with visual information that enables him/her to recognize the completion of the download of the content corresponding to the first image object and at the same time select the continuous output of and/or the continuous download of the content corresponding to the second image object.

When the second image object is output to the display unit 151 in this manner, the controller 180 detects a touch and drag in which the touch to the second image object moves to a region on which the first image object is displayed. In response to the detection of the movement of the touch and drag to the region on which the first image object is displayed, the controller 180 moves the second image object so the second image object comes into contact with one end of the first image object.

Further, according to another embodiment, the controller 180 automatically moves the second image object to come into contact with the first image object when a given amount of time elapses after the second image object is output to the display unit 151. If after the content corresponding to the first image object is completely downloaded, the first image object and the second image object come into contact with each other, the controller 180 promptly downloads the content corresponding to the second image object.

In addition, the download of the content is performed in packets. In more detail, a buffering operation is performed in which the packet is temporarily stored in a buffer in order to facilitate the transmission and receiving of the packet. For example, if the packet is received, a one-byte header and a data unit are sequentially buffered in a receiver buffer. A length of the packet is read out from the header, and the data as long as identified is read from the receiver buffer.

The buffering operation requires a given amount of time before outputting and downloading the content. According to the embodiment of the present invention, the waiting time can be saved in the buffering operation by enabling the next content to be downloaded to be selected in advance or to be selected immediately after the download (for example, the buffering is not delayed because a stream of the content is received in advance and thus free buffering is performed, or the download is successively performed).

In FIG. 7B, the controller 180 enables the first image object and the second image object to disappear from the display unit 151 while downloading the content corresponding to the second image object. If, in this state, the touch is applied to the display unit 151, the controller 180 outputs a second controller 730 on a border region between the first image object 708 and the second image object 720. The second controller 730 makes it possible to visually distinguish between the content corresponding to the first image object and the content corresponding to the second image object.

If it is detected, as illustrated in FIG. 7B, that the second controller 730 is moved to one region of the first image object by the touch, the controller 180 outputs thumbnail images 721 to 727 of the content corresponding to the second image object to segments 702 to 708 of the first image object in such a manner as to overlap the segments 702 to 708.

That is, in response to the movement of the second controller 730, a folding effect is applied to some segments 702 to 707 of the first image object, and a spreading effect is applied to the segments 721 and 727 of the content corresponding to the second image object.

In addition, according to another embodiment, if it is detected, as illustrated in FIG. 7B, that the second controller 730 is moved to the one region of the first image object by the touch when the second controller 730 is output, the controller 180 enables thumbnail images 721 to 727 of the content corresponding to the second image object to push out segments 702 to 708 of the first image object and outputs the thumbnail images 721 to 727 on the second image object.

Further, in response to the display of the location of the currently-output content by a first indicator 718 and to the movement of the first indicator 718, the controller 180 performs the screen switch to the content (that is, the content corresponding to a specific segment of the second image object) that corresponds to the location to which the content that is currently output to the display unit 151 is moved.

If the second controller 730 is moved, the controller 180 continues to perform the download, beginning with the segment of the content corresponding to the second image object corresponding to the location of the second controller 730. The extent to which the download of the content corresponding to the second image object progresses is indicated by a second indicator 715.

Referring to FIG. 7C, if the touch to one segment of segments 721 to 727 of the second image object that is output is detected, the controller 180 outputs the content corresponding to a segment 723 that is touched on, to the display unit 151, and outputs the first indicator 718 indicating the location of the content that is currently output, to the segment 723 of the second image object.

If the content corresponding to the second image object is completely downloaded, the controller 180 outputs a thumbnail image 740 of new content associated with the content corresponding to the second image object and moves the thumbnail image 740 of the new content to one end of the second image object. Thus, the controller 180 prepares for the output and the download of the content corresponding to the thumbnail image 740.

On the other hand, in FIG. 7D, if the touch is applied to the display unit 151, the controller 180 outputs a third controller 750 to a border region between the second image object 721 to 727 and the thumbnail image 740. A movement of the third controller 750 is similar to the movement of the second controller 730, and therefore a description thereof is omitted. However, as illustrated in FIG. 7D, the third controller 750 and the second controller 730 overlap as the third controller 750 moves.

If the touch is applied to the third controller 750 and the second controller 730 that are output in an overlapping state, the controller 180, as illustrated in FIG. 7E, outputs the image 702 to 708 representing the previous first image object folded between the third controller 750 and the second controller 730 and the image 721 to 727 representing the previous second image object to a region (for example, to over the first image object) that makes it possible to distinguish between the image 702 to 708 and the image 721 to 727 and the first image object. When this is done, the user can visually identify the thumbnail image of the previous content items that are completely downloaded.

In FIG. 7F, if the user touch gesture (for example, a specific touch that is applied to an image, or a touch that pinches out the overlapping controllers) is detected when the image 702 to 708 representing the previous first image object and the image 721 to 727 representing the previous second image object are output, the controller 180 sequentially outputs the corresponding thumbnail images.

Figure 9A:
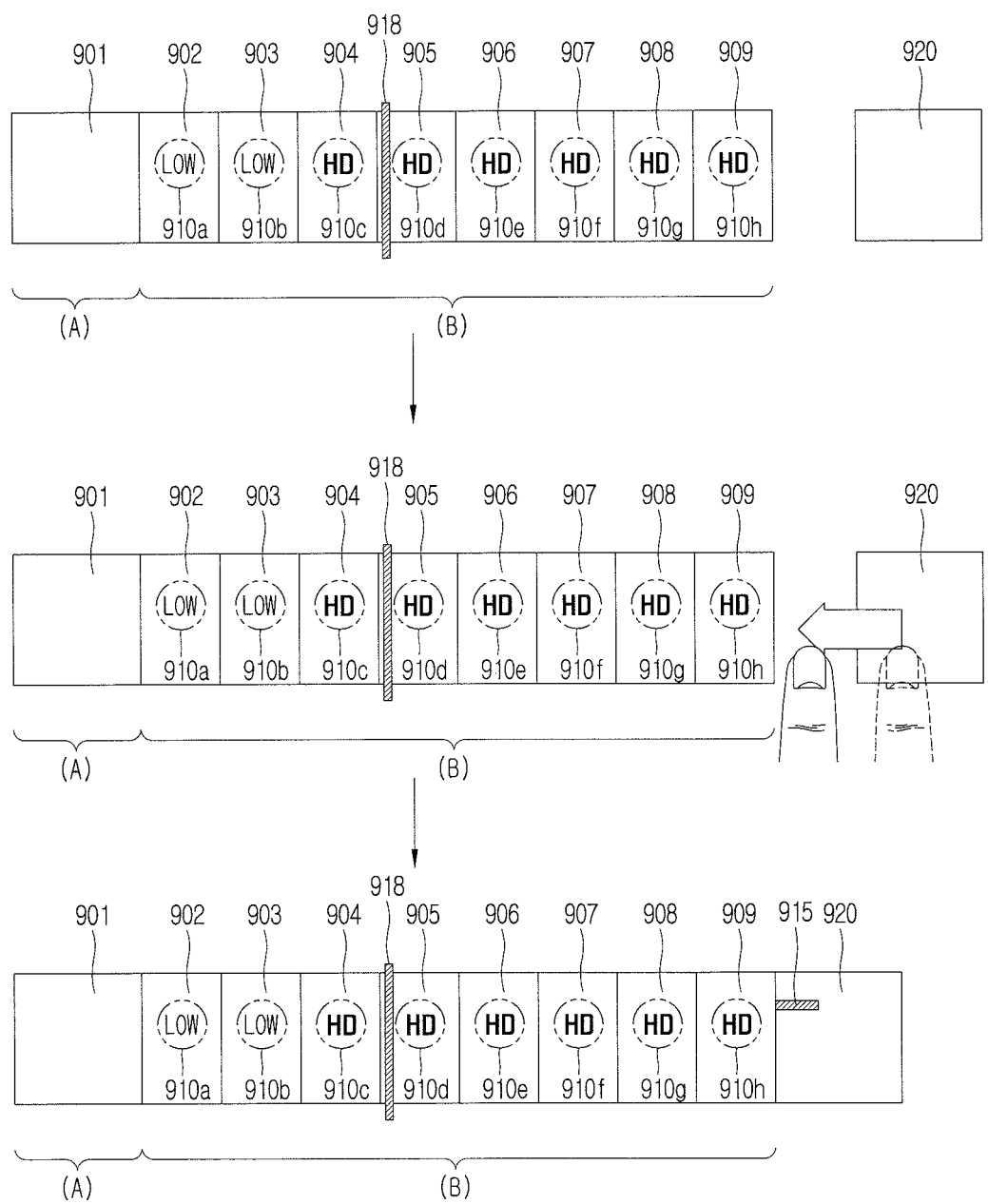

Next, FIGS. 9A and 9B are diagrams for specifically describing the control method in which the next content to be downloaded is selected and is successively downloaded. Referring to FIG. 9A, if the download of the content corresponding to a first image object 901 to 909 is completed, the controller 180 enables the first image object 901 to 909 and a second image object 920 to pop up on the display unit 151.

If the second image object 920 that pops up comes into contact with one end of the first image object 901 to 909 according to the touch input and a predetermined setting, the controller 180 begins to download the content corresponding to the second image object 920. At this time, the content corresponding to the second image object 920 continues to be downloaded with high definition ("HD"). Also, the extent to which the download progresses is indicated by an indicator 915.

FIG. 9B is an example when the second image object 920 in contact with the first image object 910 to 909 is downloaded is output to the display unit 151. At this point, the location of the content being output to the display unit 151 is indicated by a controller 918. The method is described above, in which the different content associated with the content that is currently downloaded is successively output and/or downloaded, and the information on the download state of the content is visually output.

Figure 10A:
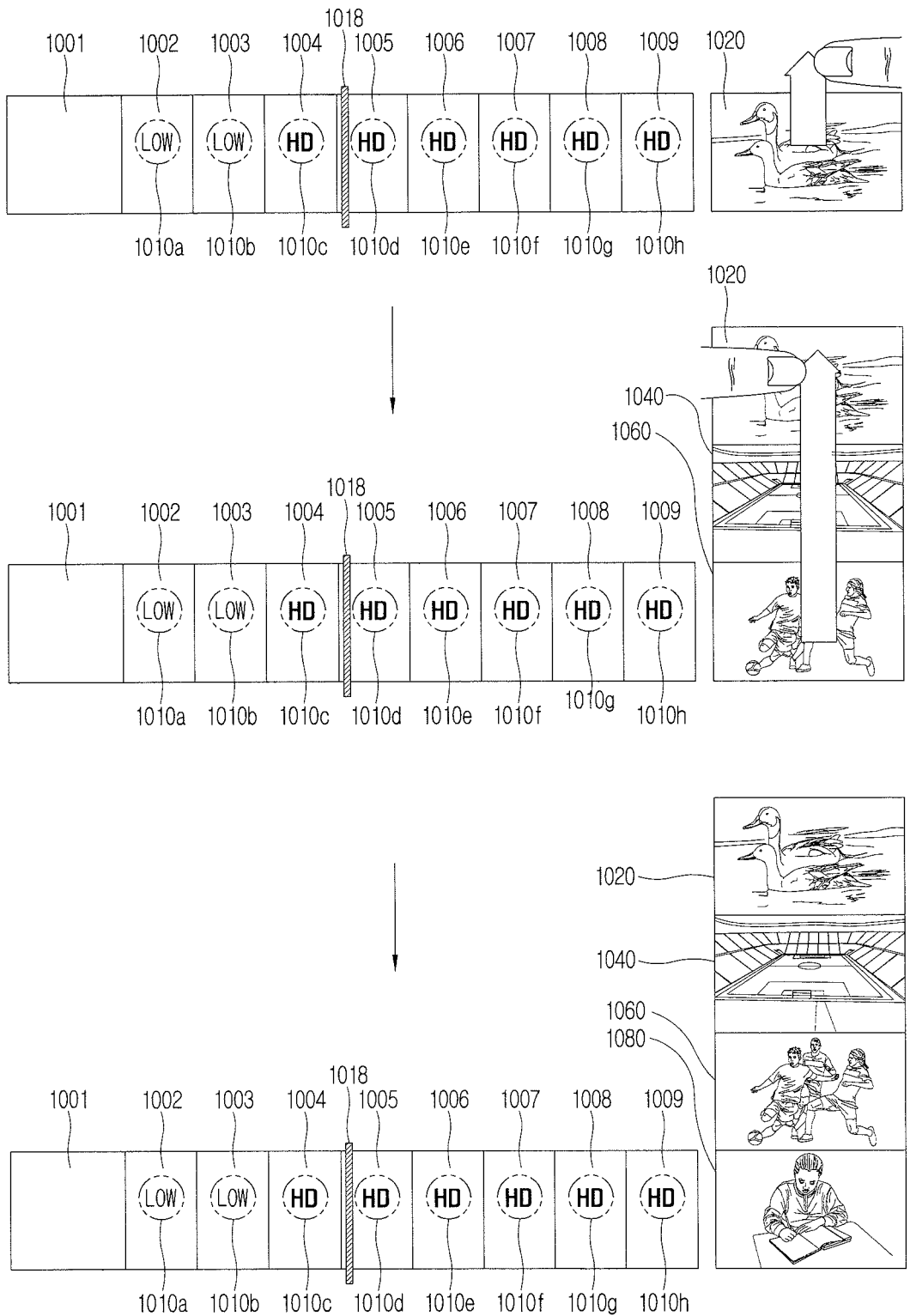
FIGS. 10A and 10B are diagrams for describing the control method in which a list for recommendation content items that are successively downloadable is output, according to one embodiment of the present invention.
Figure 10B:
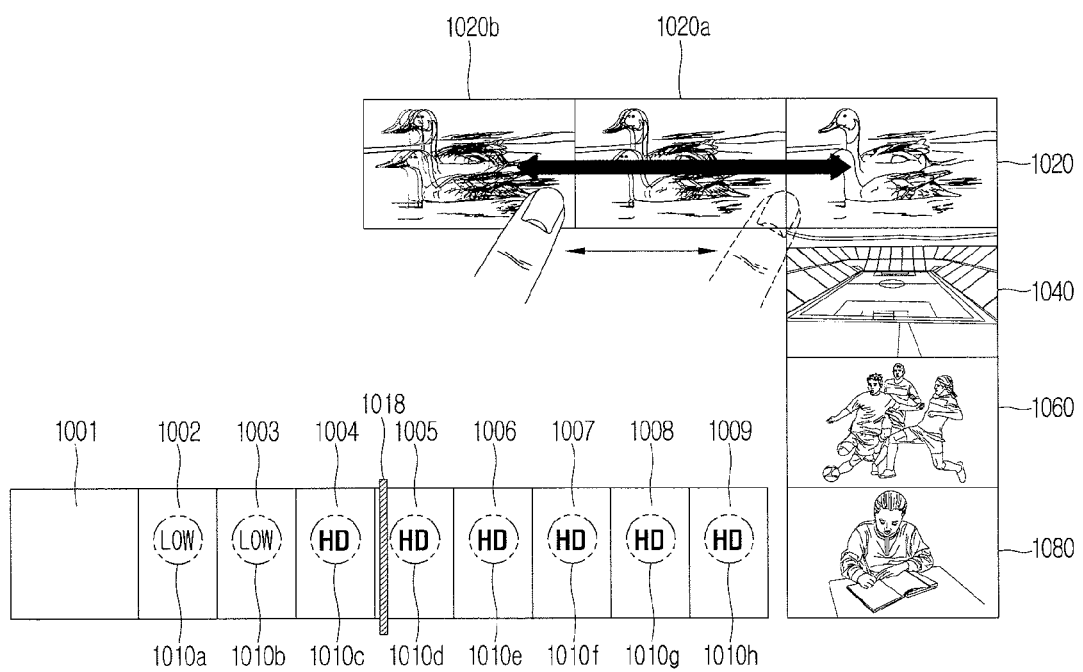

Next, referring to FIGS. 10A and 10B, a control method is described in which multiple lists for the recommendation content items that are downloadable the next time are output.

First, the control method is described in which the list for the recommendation content items that are downloadable the next time is output. The download of the content corresponding to the first image object is stopped or is completed, and thereafter, immediately or according to the touch input applied to the display unit 151, the controller 180 outputs the thumbnail image of the content that is downloadable the next time, that is, the second image object, to the display unit 151.

When the second image object is output in this manner, in response to a third touch gesture applied to the second image object, the controller 180 outputs the third image objects corresponding to the recommendation content items that are downloadable the next time, to the display unit 151. Here, the third touch gesture may be a gesture in which the flicking touch input is applied to the second image object, which is output, in the first direction (for example concurrently in the upward and download directions).

For example, if the flicking touch input in the upward direction, as illustrated in FIG. 10A, is applied to the second image object 1020, the controller 180 outputs the recommendation content items 1020 to 1080 that are downloadable the next time, as much as the number of times that the flicking touch input is applied or as much as the predetermined number of times, to the display unit 151.

Here, the recommendation content items that are downloadable the next time is associated with the content that is previously downloaded by the user. For example, the recommendation content items are output according to the various references, such as order of upload dates, content that the users download in succession to the content that they previously downloaded and viewed, content recommended by many people and others.

A method is described below in which when the list for the recommendation content items that are downloadable the next time is output, a quality mode of the download of the recommendation content items is selected. Referring to FIG. 10B, if, when the second image object and the third image object indicating the recommendation content items 1020 to 1080 that are downloadable are output in this manner, a fourth touch gesture, for example, the flicking touch input in the second direction (in the left/right-handed direction) is applied to any one of them, the controller 180 selects the quality mode of the content that is downloadable the next time. That is, the controller 180 outputs the quality modes 1020, 1020a and 1020b that are downloadable the next time, as much as the number of times that the flicking touch input is applied or as much as the predetermined number of times, to display unit 151.

The quality mode here, for example, includes one or more of a content black and white mode, an initial mode, an original content mode, a high definition mode, a low definition mode, a small-number-of-frames mode and a great-number-of-frames mode.

If the user wants to download the content speedily although the quality of the content (for example the image quality and the number of frames) is not good), he/she can select, for example, the black and white mode, the low definition mode or the small-number-of-frames mode. On the other hand, if the user wants to download the content with high image quality, he/she can select high definition mode. If the user wants to download natural images that have not any interruptions, he/she can select the great-number-of-frames mode.

Further, if a specific mode is not selected, the controller 180 can download the content that is downloadable the next time, with the same quality as the quality of the previous content. In addition, if the specific mode is not selected, the controller 180 can download the content that is downloadable the next time, with the content quality that is arbitrarily set and/or is changed depending on the network status.

Figure 11:
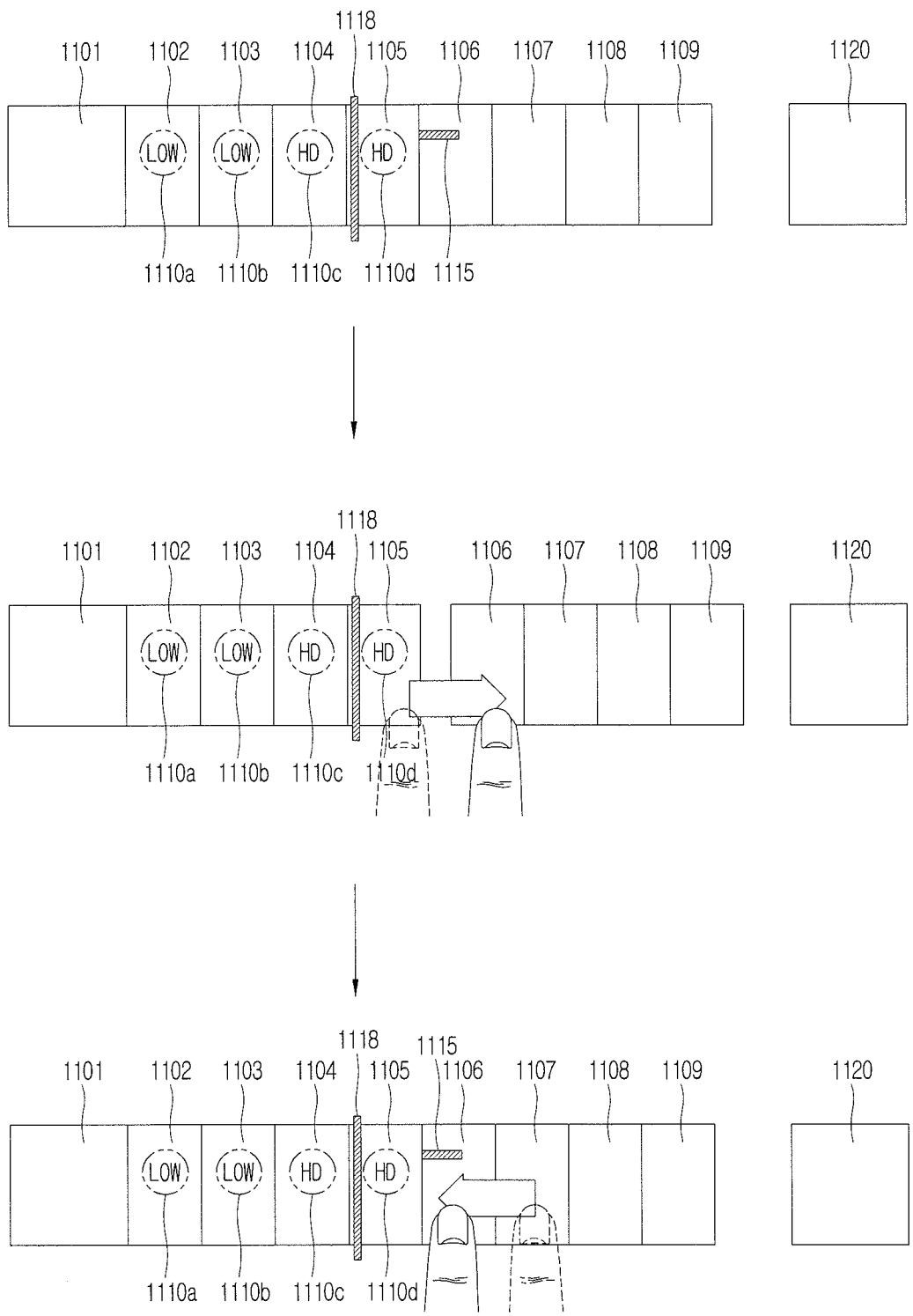
FIG. 11 is a diagram for describing the control method in which download of the content is stopped or resumed using the first image object, according to one embodiment of the present invention.

The list for the multiple recommendation content items that are downloadable the next time and the quality modes from which to choose are described above. Referring to FIG. 11, a control method is described below, in which the in-progress download of a specific segment of the content is stopped, and the download is resumed after the interruption. In particular, FIG. 11 is a diagram for describing the control method in which the download of the content is stopped or resumed using the first image object described above.

The controller 180 outputs the first image object including the thumbnail image of the content that is downloaded when the predetermined condition is met, to the display unit 151. If, when the first image object is output, the touch to one segment of the first image object is dragged in the first direction, the controller 180 stops the download, ending with the content segment corresponding to the one segment. Along with this, the controller 180 separates the first image object into a first part and a second part, and outputs the first and second parts.

For example, referring to FIG. 11, if the flicking touch input in the first direction (from left to right) to a segment 1106 while downloading the segment 1106 of the first image object is detected, the controller 180 immediately stops the download and separates the first image object into the two parts, a part preceding the segment 1106 and a part following the segment 1106.

In addition, if the flicking touch input in the first direction (from left to right) to a segment 1106 while downloading the segment 1105 of the first image object is detected, the controller 180 downloads the content, up to the content segment corresponding to the segment 1105, and stops the download, ending with the segment 1106. If the download is stopped, the controller 180 separates the first image object into the two parts, a part preceding the segment 1105 and a part following the segment 1105, as well.

The separation is made with the segment 1105 in between. At this time, if the predetermined amount of time elapses, the controller 180 enables the segment 1105 to disappear, and the controller enables the segment 1105 to appear back according to the predetermined touch. In addition, in response to the application of the flicking touch input in the upward/downward direction to the segment 1105, the controller 180 may delete the segment 1105.

If, when the first image object is separated into the first part and the second part, the touch to the second part corresponding to the segment between the first and second parts is dragged in the second direction, that is, if the flicking touch input in the second direction (from right to left) to the segment 1106 is detected, the stopped download is resumed. At this time, the controller 180 enables the first part and second parts, which results from the separations, to be brought into contact with each other, and outputs the two parts as one first image object.

According to the embodiments described above, the user is provided with the convenience of directly selecting the segment in which the download is started or stopped using the thumbnail image of the content that is downloaded. In addition, in order to view the content, the user may want to download the content in the form of a stream, which is currently downloaded or will be downloaded later, before completing the download of the content from the content provision server 200. Referring to FIG. 1, FIG. 3B, and FIGS. 12A and 12B, a control method is described below in which the segment to be viewed is selected using the first image object and/or the second image object.

FIGS. 12A and 12B are diagrams for describing the control method in which the segment of the content to be currently output to a display unit 151 is selected using the first image object and/or the second image object. In response to the transmission of the request for the download of a specific content from the mobile terminal 100 to the content provision server 200, the content provision server 200 transmits the thumbnail images of the specific content to the mobile terminal 100 ahead of time. The thumbnail images are displayed on the first image object.

The controller 180 further displays the first controller 1218 indicating the location of the content that is currently output to the display unit 151, on the first image object. The first controller 1218 can be moved by using the user touch gesture. If the first controller 1218 is moved to one region of the first image object by the touch, the controller 180 downloads the segment of the content in the form of a stream, which corresponds to the one region, with the content quality in the segment being set to the content quality corresponding to the current network status.

In addition, the controller 180 outputs the content corresponding to the one region to the display unit 151, with the content quality corresponding to the current network status. Referring to FIG. 12A, in response to the movement of the first controller on the first image object from a segment 1204 to a segment 1207, the controller 180 outputs the content corresponding to the segment 1207 to the display unit 151. In addition, the controller 180 stops the download of the content corresponding to the segment 1205, and downloads the content in the form of a stream, which corresponds to the segment 1207 to which the first controller 1218 is moved.

For example, when only the content corresponding to up to the segment 1204 is currently downloaded, the user may want to skip the segments 1205 and 1206 in order to view the content beginning with the content corresponding to the segment 1207, if he/she moves the first controller 1218 to the segment 1207, the content is downloaded in the form of a stream, beginning with the content corresponding to the segment 1207, and the data in a stream is output directly to the display unit 151.

At this time, if the current network status is not good, the content is downloaded in the form of a stream with the content quality being set to low definition ("Low"), and if the current network status is good, the content is downloaded in the form of a stream with the content quality being set to high definition ("HD"). On the other hand, if the user wants to directly view the content corresponding to the specific segment, even though the current network status is good, the content is downloaded in the form of a stream with the content quality being set to low definition in at least one part of the specific segment, and thereafter the content quality is changed to high definition and thus the content is downloaded in the form of a stream.

If the content quality is changed to low definition ("Low") in this manner, the location of an indicator 1215b is changed (from "upper to lower") in order for the user to visually recognize the change in the content quality. Then, an indicator 1215a is displayed on the segment in which the download is stopped, for example, the segment 1205 without any change (for example in the same length, location, and color), in order for the user to continuously recognize the location at which the download is stopped, For example, FIG. 12A(a) indicates that the location of the indicator 1215b is changed ("from upper to lower") because the current network status is not good. In addition, FIG. 12A(b) indicates that the location of the indicator 1215b remains unchanged ("upper") because the current network status is good. The length of the indicator 1215b becomes longer as the download of the content in the form of a stream progresses.

Referring to FIG. 12B, a method is described below in which if the content that the user wants to view is the content to be downloaded the next time, that is, the content corresponding to the second image object, this is output directly to the display unit 151. The controller 180 outputs the first image object and the second image object on the display unit 151 according to the predetermined condition described above.

If the touch gesture is applied to the second image object that is output, the controller 180 moves the second image object toward the first image object and outputs the second image object in such a manner that the second image object is brought into contact with one end of the first image object.

Accordingly, as soon as the content corresponding to the first image object is completely downloaded, the controller 180 downloads the content corresponding to the second image object. When the second image object is in contact with the first image object, in this manner, the user moves the first controller 1218 indicating the location of the content that is currently output to the display unit 151, to a region of the second image object in contact.

In response to the movement of the controller 1218 to the second image, the controller 180 outputs an effect in which thumbnail images 1201 to 1209 of the first image object are folded in the first direction (for example in the left-handed direction), and along with this, thumbnail images 1221 to 1229 of the second image object is spread in the first direction (for example in the left-handed direction). This is similar to the outputting method that is described above referring FIG. 7B.

If the thumbnail images 1221 to 1229 of the second image object are spread in this manner, the user can select the segment that he/she wants to immediately view (the segment that he/she wants to download the content in the form of a stream), from the content corresponding to the second image object, using the first controller 1218. That is, referring FIG. 12B, in response to the movement of the first controller 1218 to a location between a segment 1224 and a segment 1225 of the second image object, the controller 180 performs the download of the content in the form of a stream, beginning with the segment 1225. The user can immediately view the data in a stream on the content corresponding to the segment 1225 through the display unit 151.

As the download of the content in the form of a stream progresses in the segment 1225, the controller 180, as illustrated in FIG. 12B, outputs the indicator 1215 indicating the extent to which the download progresses, to the segment 1225. At this time, as illustrated above, the property of the indicator 1215, such as the length, the color, and the color further indicate the information on the content quality and the information on the network status, in addition to the progress information on the download.

The controller 180 outputs a different second image object 1240 to the display unit 151. The different second image object 1240 is automatically toward the first image objects 1201 to 1208 and 1221 to 1228 according to the touch, or according to the setting, and is prepared for the download. At this time, if the user wants to view the content corresponding to the specific segment of the different second image object 1240, he/she can select the specific segment by moving the first controller 1218 similarly to the manner described above. Then, the controller 180 downloads the content in the form of a stream, which corresponds to the selection selected from the thumbnails of the second image object 1240 that are spread.

In the mobile terminal according to one embodiment of the present invention and the method of controlling the mobile terminal, as described above, the quality of the content that is downloaded from the content provision server is selectively changed according to the download information that is output. This satisfies the user's various needs and makes it possible to elastically select the content quality.

In addition, in the mobile terminal according to one embodiment of the present invention and the method of controlling the mobile terminal, the next content can be successively downloaded or output by selecting ahead of time and free-buffering the different content associated with the content that is downloaded from the content provision server. This saves waiting time for the user.

Furthermore, the content items to be downloaded the next time can be easily selected using a preview of the content to be downloaded, that is, the thumbnail image, and the user is provided with convenience in which he/she can select the segment in which the download is started or is stopped, for himself/herself.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication unit configured to communicate with a content provision server over a network;
a touch screen; and
a controller configured to:
display, on the touch screen, a first image object, associated with a first content being downloaded from the content provision server,
display, on the touch screen, a second image object, associated with a second content, the second content being different from the first content being downloaded and being downloadable after the first content is downloaded,
receive a first input indicating the second image object is moved to be adjacent to the first image object, and
download the second content corresponding to the second image object as soon as the first content corresponding to the first image object is downloaded.

2. The mobile terminal according to claim 1, wherein the controller is further configured to:
receive a touch gesture to the first image object, and
change a quality of the first content based on the received touch gesture.

3. The mobile terminal according to claim 1, wherein the first image object includes multiple segments and the second content is associated with the first content, and
wherein the controller is further configured to:
display thumbnail images on the touch screen corresponding to the multiple segments included in the first image object, and
display a thumbnail image on the touch screen corresponding to the second image object.

4. The mobile terminal according to claim 1, wherein the controller is further configured to display the first and second image objects on the touch screen automatically based on at least one of a network status change event, a touch event with respect to the touch screen, and a download completion event of the first content.

5. The mobile terminal according to claim 2, wherein the controller is further configured to display an indicator on the first image object indicating network status information and quality information of the first content, and
wherein when the network status information changes, the controller is further configured to change a quality of the first content being downloaded and to adjust the indicator to reflect a network being used to change the quality of the first content.

6. The mobile terminal according to claim 5, wherein the indicator further indicates progress information on the first content being downloaded.

7. The mobile terminal according to claim 1, wherein the controller is further configured to receive network status information, and automatically change a quality of the first content being downloaded based on the received network status information.

8. The mobile terminal according to claim 1, wherein the controller is further configured to:
when changing a first communication mode to a second communication mode for downloading the first or second content, change an image quality of the first or second content being downloaded from a high state to a low state, and
when changing the second communication mode to the first communication mode, change the image quality of the first or second content being downloaded from the low state to the high state.

9. The mobile terminal according to claim 8, wherein the first communication mode is for a free-of-charge network or for a sufficiently good network connection state, and
wherein the second communication mode is for a pay network or for a not sufficiently good network connection state.

10. The mobile terminal according to claim 1, wherein the controller is further configured to:
determine a quality of the content based on a number of frames of the first or second content, and
set the number of frames of the first or second content being downloaded to a predetermined maximum value in a first communication mode and set the number of frames of the first or second content being downloaded to a predetermined threshold value in a second communication mode.

11. The mobile terminal according to claim 10, wherein the first communication mode is for a free-of-charge network or for a sufficiently good network connection state, and
wherein the second communication mode is for a pay network or for a not sufficiently good network connection state.

12. The mobile terminal according to claim 1, wherein the controller is further configured to distinctly display the second image object in response to completion of the download of the first content.

13. The mobile terminal according to claim 1, wherein the controller is further configured to display a first display controller on the first image object indicating a location of the first content that is currently displayed on the touch screen.

14. The mobile terminal according to claim 13, wherein the controller is further configured to:

receive an input signal indicating the first controller is moved to a segment of the first image object, and set a content quality of the segment of the first image object based a current network status between the mobile terminal and the content server.

15. The mobile terminal according to claim 13, wherein the controller is further configured to display a second display controller to a border region between the first image object and the second image object when the first image object is in contact with the second image object.

16. The mobile terminal according to claim 15, wherein the controller is further configured to:

receive an input signal indicating the second controller is moved to a particular segment of the first image object, and display thumbnail images of the second content in an overlapped manner or a spreading manner with thumbnail images of the first content.

17. The mobile terminal according to claim 1, wherein the controller is further configured to:

receive an input signal indicating the second image object has been touch selected, and display a plurality of additional image objects corresponding to recommendation content items that can be downloaded next.

18. The mobile terminal according to claim 3, wherein the controller is further configured to:

receive a first touch dragging signal indicating one segment of the first image object is dragged in a first direction, stop downloading the content corresponding to the touched segment, and separate the first image object into a first part and a second part, the first part including segments before the touched segment and the second part including the touched segment and segments after the touched segment.

19. The mobile terminal according to claim 18, wherein the controller is further configured to:

receive a second touch dragging signal indicating one segment of the first image object is dragged in a second direction opposite to the first direction, resume downloading the content corresponding to the touched segment, and recombine the first part and the second part of the first image object.

20. A method of controlling a mobile terminal, the method comprising:

communicating, via a wireless communication unit, with a content provision server over a network;

displaying, via a touch screen, a first image object, associated with a first content being downloaded from the content provision server;

displaying, via the touch screen, a second image object, associated with a second content, the second content being different from the first content being downloaded and being downloadable after the first content is downloaded;

receiving, via a controller, a first input indicating the second image object is moved to be adjacent to the first image object; and downloading, via the controller, the second content corresponding to the second image object as soon as the first content corresponding to the first image object is downloaded.

* * * * *